United States Patent
Iwasaki et al.

[11] Patent Number: 6,097,311
[45] Date of Patent: Aug. 1, 2000

[54] WARNING DEVICE FOR DISTANCE BETWEEN CARS

[75] Inventors: Mitsuru Iwasaki; Yasuhisa Nakahara; Takuya Yanaka, all of Tokyo, Japan

[73] Assignee: Calsonic Corporation, Tokyo, Japan

[21] Appl. No.: 09/051,808

[22] PCT Filed: Oct. 17, 1995

[86] PCT No.: PCT/JP95/02124

§ 371 Date: Jun. 22, 1998

§ 102(e) Date: Jun. 22, 1998

[87] PCT Pub. No.: WO97/14584

PCT Pub. Date: Apr. 24, 1997

[51] Int. Cl.[7] .................................................. G08G 1/16
[52] U.S. Cl. ........................ 340/903; 340/435; 340/436; 180/169
[58] Field of Search ............................... 340/903, 904, 340/436, 438, 435, 942; 180/271, 167, 169

[56] References Cited

U.S. PATENT DOCUMENTS

| | | | |
|---|---|---|---|
| 5,357,438 | 10/1994 | Davidian | 364/461 |
| 5,594,414 | 1/1997 | Namngani | 340/436 |
| 5,631,639 | 5/1997 | Hibino et al. | 340/903 |
| 5,684,473 | 11/1997 | Hibino et al. | 340/903 |

FOREIGN PATENT DOCUMENTS

| | | |
|---|---|---|
| 0 677 799 A2 | 10/1995 | European Pat. Off. . |
| 4-213200 | 8/1992 | Japan . |
| 4-134770 | 12/1992 | Japan . |
| 4-372100 | 12/1992 | Japan . |
| 5-67299 | 3/1993 | Japan . |
| 7-277041 | 10/1995 | Japan . |
| WO 94/19705 | 9/1994 | WIPO . |

OTHER PUBLICATIONS

*Electronic Applications for Enhancing Automotive Safety*, 372 Automotive Engineering, 98 (1990) Sep. No. 9, pp. 55–61, Warrendale, PA. US.

Primary Examiner—Jeffery A. Hofsass
Assistant Examiner—Sihong Huang
Attorney, Agent, or Firm—Woodbridge & Associates, P.C.; Richard C. Woodbridge

[57] ABSTRACT

A warning device for a distance between cars, for measuring a distance between a car and an object in front of the car, judging the possibility of danger on the basis of distance data thus obtained, and generating an alarm in the case where it is judged to be dangerous. The warning device provides a first alarm (a rear-end collision alarm) generated in a condition of alert which necessitates deceleration or braking, and a second alarm (an alarm for a distance between cars) generated in a condition of alert which does not necessitate deceleration nor braking, the first and second alarms, respectively, being judged by separate formulae for determining. Accordingly, it is possible to positively generate an alarm when deceleration or braking is necessitated. Further, the warning device discriminates a kind of an object being measured (a moving body, obstruction, guardrail or the like) to judge danger according to the kind of the discriminated object. Accordingly, it is possible to improve reliability of an alarm and, in particular, to reduce incorrect alarms such as by a guardrail.

11 Claims, 20 Drawing Sheets

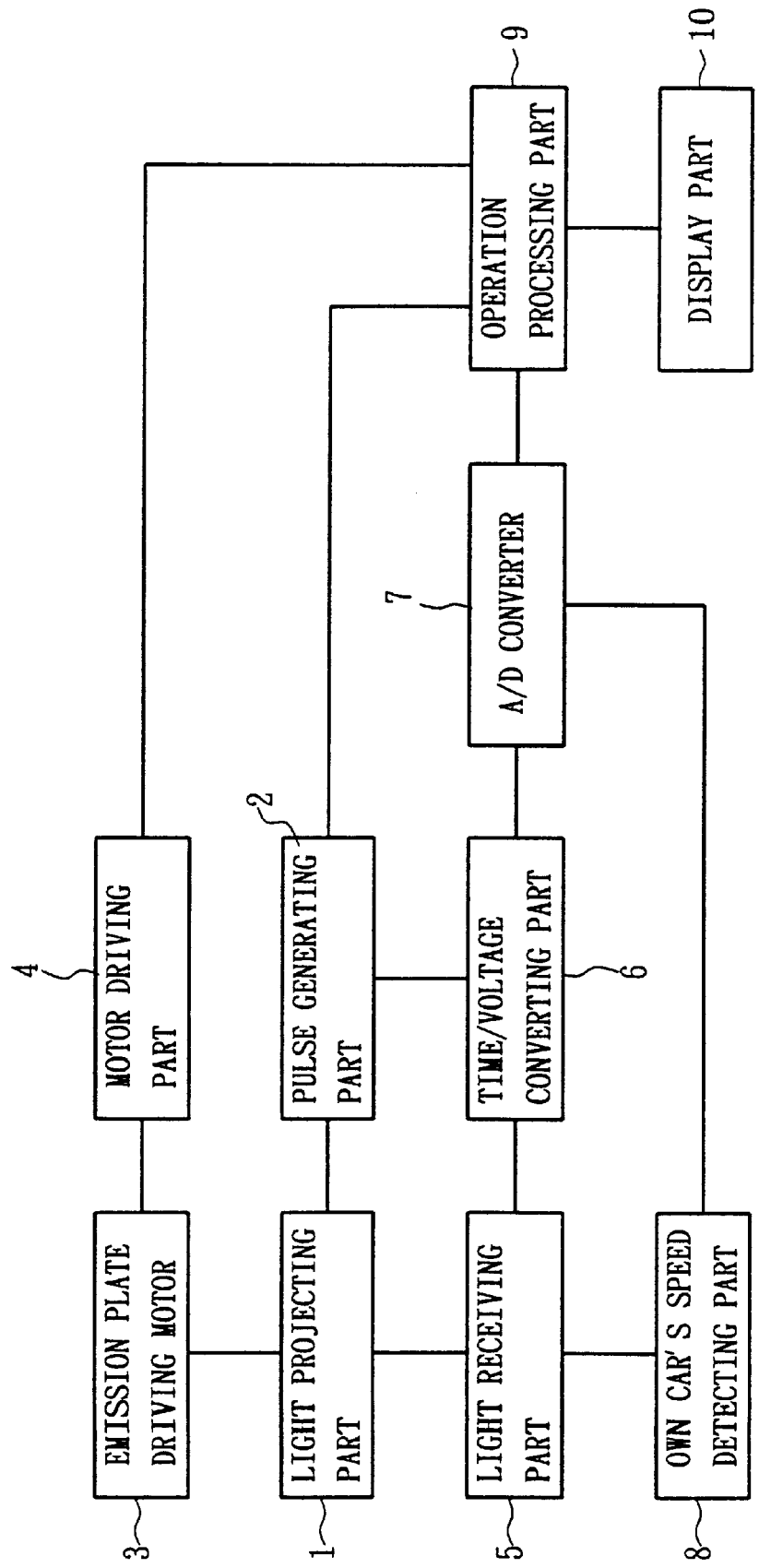

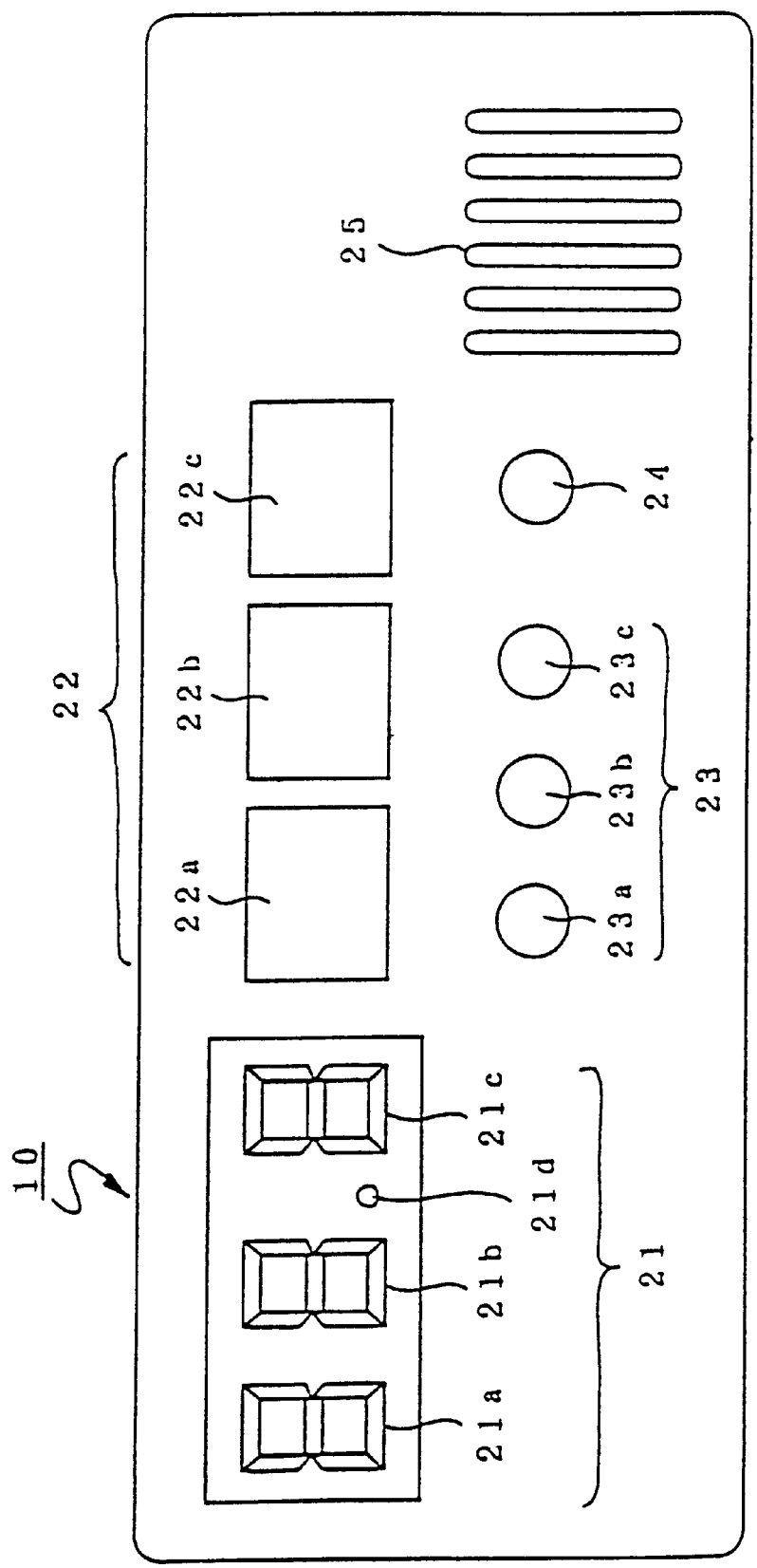

FIG. 3

| MODE NO. | PURPOSE OF USE | SEGMENT LED DISPLAY (EXAMPLE) | |
|---|---|---|---|
| 1 | MODE OF SETTING TIMING FOR REAR-END COLLISION ALARM | 1 0.9 | SET AT 0.9 SECOND |
| 2 | MODE OF ON/OFF SWITCHING SOUND OF REAR-END COLLISION ALARM | 2 0 F | SET AT OFF STATUS |
| 3 | MODE OF SETTING TIMING FOR CAR-TO-CAR ALARM | 3 0.6 | SET AT 0.6 SECOND |
| 4 | MODE OF ON/OFF SWITCHING SOUND OF CAR-TO-CAR ALARM | 4 0 n | SET AT ON STATUS |
| 5 | MODE OF ALIGNMENT OF OPTICAL AXIS | 5 9.9 | MEASURING DISTANCE 9.9 M |
| 6 | MODE OF CONFIRMING OWN CAR'S SPEED | 6 6 0 | OWN CAR'S SPEED 60 KM/H |
| 7 | MODE OF SETTING AMOUNT OF SOUND OF ALARM SOUND | 7 H I | SET AT HI |

F I G. 4

| KIND OF ALARMING LAMP | | COLOR OF LAMP | SOUND OF ALARM | DEGREE OF DANGER | EXPLANATION OF DEGREE OF DANGER |
|---|---|---|---|---|---|
| CAR-TO-CAR ALARM LAMP | CAR-TO-CAR ALERT ALARM | GREEN | NO | 0-30% | NOT LESS THAN $(T_1+1.5)$ SECONDS ALLOWED FOR APPLYING BRAKES |
| | CAR-TO-CAR ALERT ALARM | ORANGE | NO | 30-60% | NOT LESS THAN $(T_1+0.5)$ SECONDS ALLOWED FOR APPLYING BRAKES |
| | CAR-TO-CAR DANGER ALARM | RED | YES | 60-90% | NOT LESS THAN $T_1$ SECONDS ALLOWED FOR APPLYING BRAKES |
| REAR-END COLLISION ALARM LAMP | | FLICKER OF RED | YES | 90-100% | COLLISION UNAVOIDABLE UNLESS BRAKES ARE APPLIED WITHIN $T_2$ SECONDS |

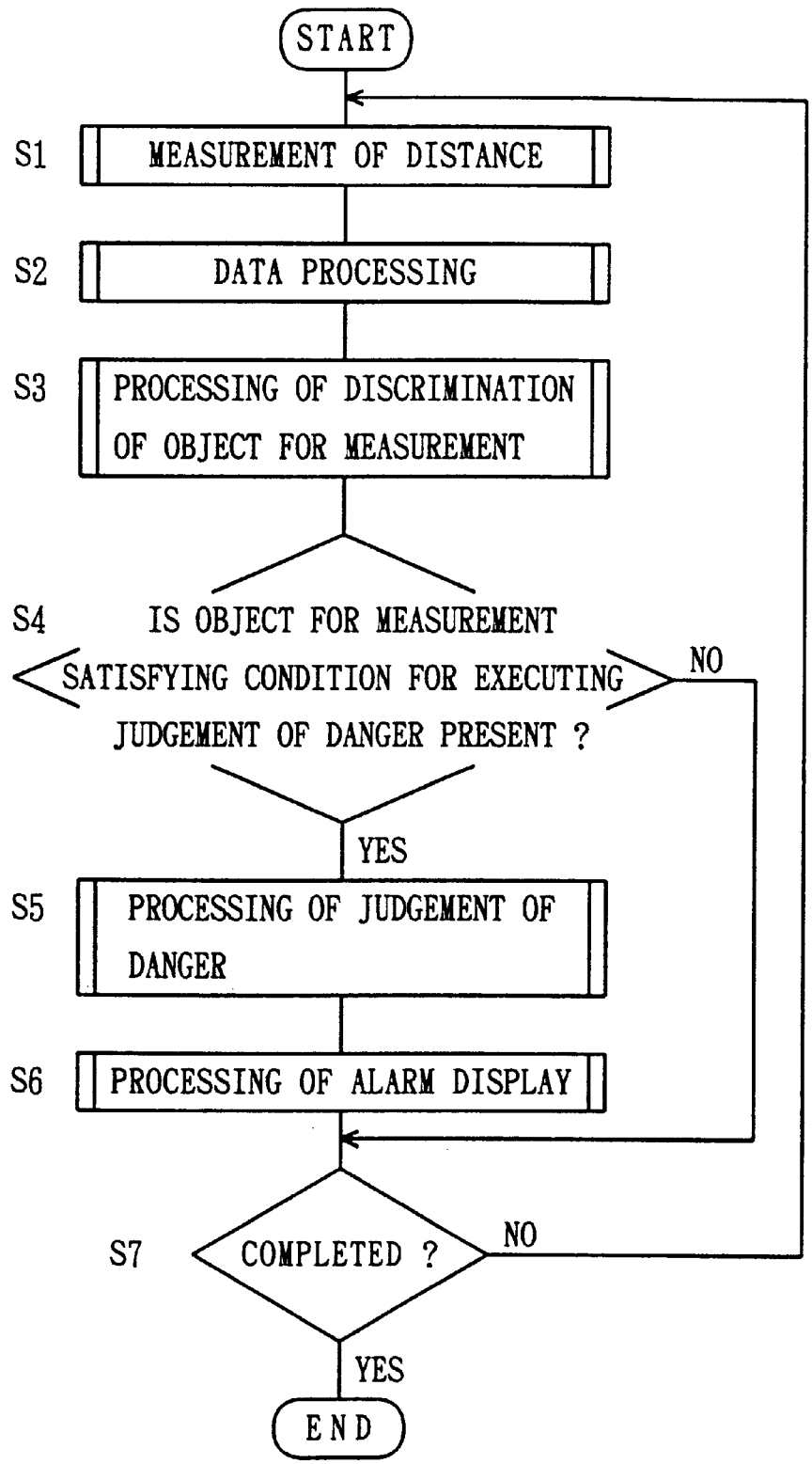

F I G. 1 4
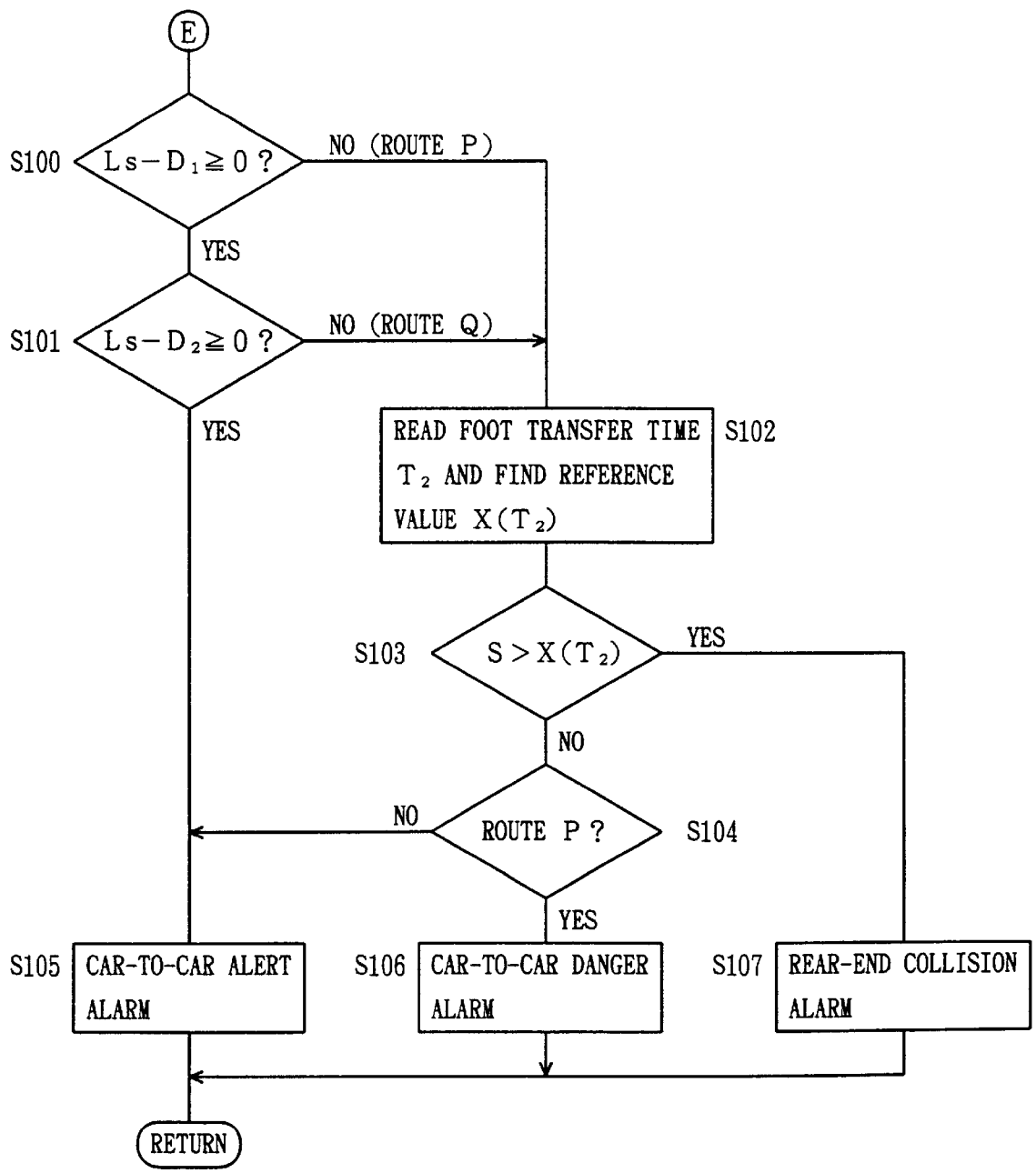

FIG. 19

| VEHICLE SPEED V (KM/H) | 30 | 40 | 50 | 60 | 70 | 80 | 90 | 100 |
|---|---|---|---|---|---|---|---|---|
| BRAKING DISTANCE f(V) (M) | 8 | 12 | 19 | 28 | 39 | 54 | 68 | 84 |

FIG. 20

| VEHICLE SPEED V (KM/H) | 10 | 20 | 30 | 40 | 50 | 60 | 70 | 80 | 90 | 100 |
|---|---|---|---|---|---|---|---|---|---|---|
| CAR-TO-CAR DISTANCE d (M) DURING SAFETY STOP | 2.2 | 2.4 | 2.6 | 2.8 | 3.0 | 3.2 | 3.4 | 3.6 | 3.8 | 4.0 |

F I G. 21

| OWN CAR'S SPEED V$_2$ (KM/H) | 10 | 20 | 30 | 40 | 50 | 60 | 70 | 80 | 90 | 100 |
|---|---|---|---|---|---|---|---|---|---|---|
| REFERENCE VALUE X(V$_2$)(KM/H) | 2.0 | 2.9 | 3.8 | 4.6 | 5.5 | 6.5 | 7.4 | 8.3 | 9.1 | 10.0 | though it is a difficult task.

WARNING DEVICE FOR DISTANCE BETWEEN CARS

TECHNICAL FIELD

This invention relates to a highly reliable car-to-car distance alarm device for use in an automobile, endowed with two kinds of alarm, i.e. a car-to-car alarm and a rear-end collision alarm, adapted to emit these alarms by using two kinds of formula of decision and discriminate the kind of object for measurement, judge the danger ascribable to the discriminated kind of object, and thereby allow infallible issuance of an alarm in a state necessitating deceleration or manipulation of brakes, and furthermore enabled to reduce incorrect alarms by a guardrail etc.

BACKGROUND ART

Recently, as one approach to the promotion of convenience of an automobile, a device called "car-to-car distance alarm device for an automobile" which, in observance of the concept of active safety directed to prevention of an accident, is adapted to measure the distance from the user's own automobile to a preceding automobile, judge the danger of collision of the two automobiles and, on detecting the danger, issue an alarm to urge the driver's attention has been developed and adopted for practical use.

In the conventional car-to-car distance alarm devices for use in an automobile, the judgement of the presence or absence of a dangerous situation is generally accomplished by emitting one beam or three beams of laser light thereby measuring the distance to an object for measurement and comparing the measured distance with the safety car-to-car distance in accordance with one formula of decision. Some of these devices, however, are adapted such that the user is allowed to adjust freely the timing of issuing an alarm by adequately varying the safety car-to-car distance used in the formula of decision (refer to JP-A-58-10,198, for example).

In the car-to-car distance alarm devices for an automobile which are constructed as described above, however, one formula of decision is relied on to judge the question whether or not the alarm is to be issued. Generally speaking, this fact is suspected to bring about various disadvantages when the user has set the issuance of an alarm difficult. When the user's automobile is involved in traffic congestion, for example, the user is apt to set difficult the issuance of an alarm with a view to avoiding an unwanted addition to the noise of alarm. This fact implies the possibility that the issuance of an alarm will fail notwithstanding the situation generally threatens high danger of rear-end collision. Even some of the devices of the type which do not allow the user to adjust the timing of issuing an alarm are adapted to refrain from issuing an alarm when the user's automobile is running at a speed not more than a fixed level for the purpose of avoiding frequent issuance of an alarm during a course of traffic congestion. They have the possibility of posing the same problem.

The conventional car-to-car distance alarm devices for an automobile emit the laser light in one beam or three beams for the measurement of the distance. They are, therefore, incapable of discriminating between such items as guardrails, road signs, and other facilities attendant on roads, slopes of mountains, and walls of buildings which obstruct the travel of the user's own automobile and such items as vehicles running ahead and obstacles on roads which can obstruct the travel of the user's own automobile and often tend to issue an erroneous alarm such as by a guardrail.

It is, therefore, an object of this invention to provide a highly reliable car-to-car distance alarm device for an automobile, which is capable of infallibly issuing an alarm in a state necessitating deceleration or manipulation of brakes, even in the case where the user has set the issuance of an alarm difficult.

It is a further object of this invention to provide a highly reliable car-to-car distance alarm device for an automobile, which can reduce incorrect alarms such as by a guardrail.

DISCLOSURE OF THE INVENTION

This invention is directed to a car-to-car distance alarm device for an automobile, adapted to measure a distance between a user's own automobile and an object existing ahead of the own automobile, judge the presence or absence of danger based on distance data thus obtained, and issue an alarm on the case where it is judged to be dangerous, which device is provided with a first alarm to be issued when it is in such a state as urges alert and necessitates deceleration or application of brakes and a second alarm to be issued when it is in such a state as deserves alert and yet falls short of necessitating deceleration or application of brakes and enabled to judge the question whether the first alarm is issued, the second alarm is issued, or neither of the alarms is issued in accordance with a first formula of decision formed of one or more formulas of decision concerning a safety car-to-car distance and a second formula of decision concerning a difference of speed between the own automobile and the object. Owing to this construction, the device is enabled to issue the alarm (first alarm) infallibly in a state necessitating deceleration or application of brakes.

This invention is also directed to the car-to-car distance alarm device for an automobile mentioned above, which is provided with distance measuring means for emitting a light beam in a prescribed plurality of directions and measuring a distance to an object in the plurality of directions, first discriminating means for comparing a change of the distance measured in the first and the second measurement in the same direction by the distance measuring means with a distance of travel of the own automobile and discriminating whether an object existing in that direction is a moving object or a fixed object, second discriminating means for, when the first discriminating means has judged the presence of not less than a prescribed number of fixed objects ahead of the own automobile, regressing distance data thereof to find the standard deviation and comparing the obtained standard deviation with a prescribed value thereby discriminating whether or not the fixed objects are exclusively nonobstacles incapable of obstructing the travel of the own automobile, danger deciding means for deciding the presence or absence of danger by a prescribed formula of decision, depending on the kind of object discriminated by the first discriminating means or the second discriminating means, and alarm issuing means for issuing a prescribed alarm when the danger deciding means has judged the presence of danger. The reliability of an alarm can be exalted and particularly an incorrect alarm by a nonobstacle such as a guardrail can be reduced by discriminating the kind of object under measurement and executing the decision of danger in conformity to the discriminated kind of object as described above.

BRIEF DESCRIPTION OF THE DRAWINGS

FIG. 1 is a block diagram illustrating the construction of a car-to-car distance alarm device for an automobile as a preferred embodiment of this invention.

FIG. 2 is a schematic diagram illustrating the construction of a display part 10 shown in FIG. 1.

FIG. 3 is an explanatory diagram concerning the contents of the mode to be set by the user.

FIG. 4 is a diagram to aid in the description of the contents of a car-to-car distance alarm.

FIG. 5 is a main flow chart illustrating schematically the operation of an operation processing part 9 shown in FIG. 1.

FIG. 14 is a flow chart continuing to step S98 in the flow chart shown in FIG. 13.

FIG. 19 is a diagram showing one example of the relation between a vehicle speed V and a braking distance f(V).

FIG. 20 is a diagram showing one example of the relation between a vehicle speed V and a car-to-car distance d during a safety stop.

FIG. 21 is a diagram showing one example of the relation between a speed $V_2$ of the user's own automobile and a reference value $X(V_2)$ for comparison.

BEST MODE FOR CARRYING OUT THE INVENTION

Figure 6:
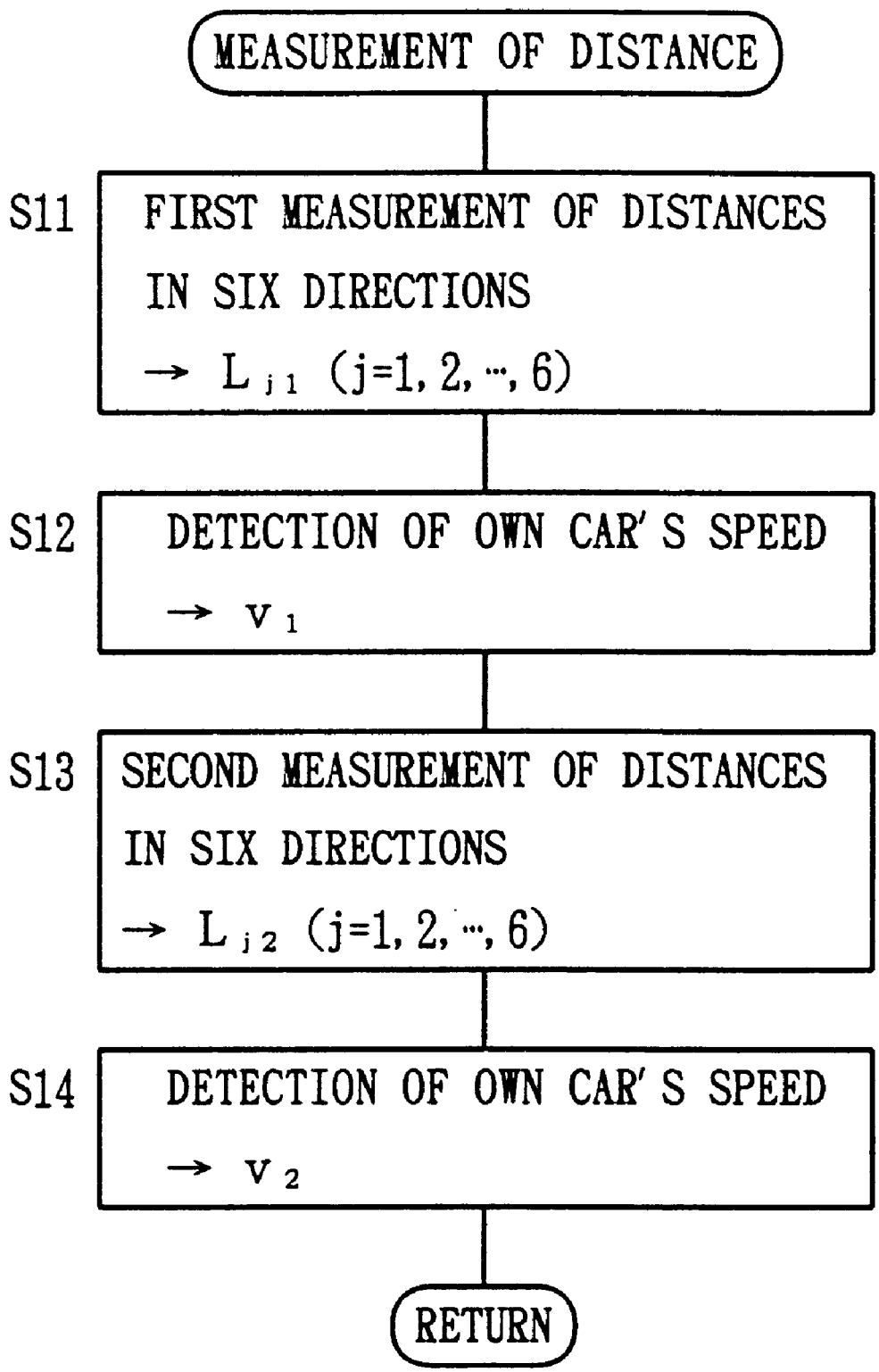
FIG. 6 is a flow chart of the distance measuring process shown in FIG. 5.

This invention will be described in detail below with reference to the drawings annexed hereto.

FIG. 1 illustrates the construction of a car-to-car distance alarm device for an automobile as a preferred embodiment of this invention.

This car-to-car distance alarm device of this invention is provided with a light projecting part 1 for sequentially and intermittently emitting a beam of laser light having a prescribed wavelength (a near infrared laser beam, for example) in a prescribed plurality of directions (six directions, for example). This light projecting part 1 preferably incorporates therein a light source such as a semiconductor laser diode for oscillating a near infrared laser beam and an emission plate for varying the angle of emission of the near infrared laser beam. To the light projecting part 1 is connected a pulse generating part 2 which generates a pulse signal for causing intermittent oscillation of the near infrared laser beam at a prescribed cycle in the light source mentioned above. The emission plate incorporated in the light projecting part 1 is driven by an emission plate driving motor 3 within a prescribed range of motion. The emission plate driving motor 3 is driven by a motor driving part 4. The motor driving part 4 is composed of such a power element as a power transistor, a signal converting part for positioning the motor 3, etc. The reflected light which is produced when the near infrared laser beam emitted from the light projecting part 1 impinges on an object for measurement is detected by a light receiving part 5. To the light receiving part 5 is connected a time/voltage converting part 6 which converts the time intervening between a point at which the light projecting part 1 emits the near infrared laser beam and a point at which the beam returns to the light receiving part 5 after being reflected on the object under measurement into a voltage. This time/voltage converting part 6 is connected also to the pulse generating part 2 so as to establish synchronization with the timing of emission of the near infrared laser beam. A voltage analog signal (time data) emitted from the time/voltage converting part 6 is converted by an A/D converter 7 into a digital signal and then transmitted to an operation processing part 9 which will be mentioned later. To the A/D converter 7 is also connected an own car's speed detecting part 8 for detecting a speed of the user's own automobile. An analog signal (own car's speed data) emitted from the own car's speed detecting part 8 is likewise converted by the A/D converter 7 into a digital signal and then transmitted to the operation processing part 9. This operation processing part 9 is intended to compute the distance to an object under measurement based on the time data from the time/voltage converting part 6 and decide the degree of danger based on the resultant distance data. The operation processing part 9 comprises microcomputers, for example, and incorporates such memories as ROM and RAM therein. The measurement of distance is performed in six directions as mentioned above. By performing this measurement of distance in the six directions up to two repetitions a brief interval apart, the kind of object under measurement can be discriminated as described specifically below. To the operation processing part 9 are severally connected the pulse generating part 2 and the motor driving part 4 mentioned above. The pulse generating part 2 and the motor driving part 4 are severally started/stopped by an operation start/stop signal emanating from the operation processing part 9 and are mutually synchronized. Further to the operation processing part 9 is connected a display part 10 which fills the role of displaying the outcomes of the arithmetic operations, namely the distance to the object under measurement and the degree of danger and so forth, and issuing a relevant alarm. Incidentally, the distance measuring means is composed of the light projecting part 1, pulse generating part 2, emission plate driving motor 3, motor driving part 4, light receiving part 5, time/voltage converting part 6, A/D converter 7, and operation processing part 9, the first and the second discriminating means and danger deciding means are composed of the operation processing part 9, and the alarm issuing means is composed of the display part 10.

The present device is endowed with two kinds of car-to-car distance alarm, i.e. a rear-end collision alarm as the first alarm and a car-to-car alarm (particularly a car-to-car alarm in the narrow sense of the word, meaning "car-to-car danger alarm" which will be specifically described herein below) as the second alarm, and they are decided by using two kinds of formula of decision as will be described specifically herein below. The term "car-to-car alarm" as used herein means the case in which the user's automobile approximates so closely to an object for measurement ahead that the user must be alert and nevertheless can cope with the situation without deceleration or application of brakes and the term "rear-end collision alarm" means the case in which the user's automobile approximates so closely to an object for measurement ahead that the user must definitely resort to deceleration or application of brakes. Where the distance between other automobile ahead and the user's automobile is 10 m and the current traveling speed of the user's automobile is 50 km/h, for example, the car-to-car alarm is issued when the current traveling speed of other automobile is not less than 50 km/h because the user has no use for deceleration or application of brakes, whereas the rear-end collision alarm is issued when the current traveling speed of other automobile is less than 50 km/h because the user must resort to deceleration or application of brakes.

The car-to-car distance alarm device for an automobile which is constructed as described above can be mounted on various automobiles such as passenger car, bus, truck, special vehicle, and two-wheeler which are chiefly used on roads. This device is constructed such that it can detect an object falling in a zone about 100 m ahead and about 8.5 m wide. Specifically, the light projecting part 1 continuously varies within the prescribed range of motion the angle of the emission plate disposed therein by means of the emission plate driving motor 3 actuated by the motor driving part 4 so as to emit the near infrared laser beam in six directions with the direction of this emission changed one degree (°) at a time and meanwhile oscillates the near infrared laser beam at the prescribed cycle from the light source (semiconductor laser diode) in accordance with the pulse signal generated in the pulse generating part 2 which is synchronized with the variation of angle. In this case, therefore, the area of detection in the foreground is about 5 degrees (°) in terms of angle. The distance to an object for measurement ahead in a given direction can be measured by clocking the time which intervenes between a point at which the near infrared laser beam is emitted and a point at which it is returned after being reflected on an object for measurement falling in that direction. To be specific, the reflected light in each of the directions from the object for measurement is detected by the light receiving part 5, the time intervening between the point of emission from the light projecting part 1 and the point of return to the light receiving part 5 after reflection is measured in the form of the magnitude of voltage at the time/voltage converting part 6, and the magnitude thus measured is transmitted via the A/D converter 7 to the operation processing part 9. The operation processing part 9 computes the distance to the object for measurement based on the data of time from the time/voltage converting part 6 and the velocity of light. The measurement of distance in the six directions is carried out by one scan in the manner described above.

FIG. 2 illustrates the construction of the display part 10 shown in FIG. 1.

This display part 10 is roughly composed of an LED part 21 for displaying numerical values etc., an alarm lamp 22 for indicating the kind of alarm, a mode switch 23 for the user's own setting, an ON/OFF switch 24 for the power source, and a speaker 25 for emitting a sound of alarm. The LED part 21 comprises three 7-segment LED's 21a, 21b, and 21c and one decimal point LED 21d. The alarm lamp 22 comprises a green LED 22a, an orange LED 22b, and a red LED 22c. The mode switch 23 for user's setting is composed of a mode selection switch 23a for selecting modes, an up (↑) switch 23b to be used in increasing the numerical value displayed in the LED part 21 or selecting the ON state, and a down (↓) switch 23c to be used in decreasing the numerical value displayed in the LED part 21 or selecting the OFF state.

FIG. 3 explains the contents of the mode for the user's setting.

This invention contemplates judging the car-to-car alarm and the rear-end collision alarm severally by using two kinds of formula of decision as described above. It also allows the user to adjust the timings severally for emitting the car-to-car alarm and the rear-end collision alarm at his own discretion (personal errors such as due to speed of reaction and character). The adjustment of the timing for issuing an alarm is carried out, for example, by varying the so-called foot transfer time (the driver's retardation in reaction). The present device allows even the ON/OFF of the sound of alarm, the alignment of the optical axis, the setting of the volume of the sound of alarm and so forth in addition to the setting of timing for a rear-end collision/car-to-car alarm as described above. In this device, the car-to-car alarm (in the broad sense of the word) comes in two kinds, i.e. a car-to-car danger alarm (a car-to-car alarm in the narrow sense of the word) and a car-to-car alert alarm. The car-to-car alert alarm is further divided into two steps, depending on the degree of danger of collision.

Specifically, the mode can be switched sequentially by giving a push at a time to the mode selecting switch 23a after the power source has been turned on by the power source ON/OFF switch 24. The present device has seven modes prepared for the user's setting. The number identifying the set mode is displayed on the 7-segment LED 21a. Mode 1, for example, is a mode for setting the timing for issuing the rear-end collision alarm. The user is allowed to set the foot transfer time $T_2$ for the rear-end collision alarm freely by manipulating the up switch 23b and the down switch 23c. The foot transfer time $T_2$ thus set for the rear-end collision alarm is displayed on the 7-segment LED's 21b and 21c. Mode 2 is a switch mode for turning ON/OFF the sound of alarm for the rear-end collision alarm; the status ON is set by depressing the up switch 23b and the status OFF the down switch 23c. The state of the ON/OFF setting is displayed on the 7-segment LED's 21b and 21c. Mode 3 is a mode for setting the timing for issuing the car-to-car alarm; the foot transfer time $T_1$ for the car-to-car alarm can be freely set by the up switch 23b and the down switch 23c. The foot transfer time $T_1$ so set for the car-to-car alarm is displayed on the 7-segment LED's 21b and 21c. Mode 4 is a switch mode for turning ON/OFF the sound of alarm of the car-to-car alarm in the narrow sense of the word (namely, the car-to-car danger alarm); the status ON is set by depressing the up switch 23b and the status OFF by the down switch 23c. The state of the ON/OFF setting is displayed on the 7-segment LED's 21b and 21c. Mode 5 is a mode for aligning the optical axis. The alignment of the optical axis by the present device is attained with the aid of a test target. The alignment thus effected can be announced as perfect when this device actuated with the target placed at a stated distance (10 m, for example) ahead thereof exactly measures the distance to the target. Mode 6 is a mode for confirming the current traveling speed of the user's own automobile. The speed of the own automobile detected by the own car's speed detecting part 8 is displayed on the 7-segment LED's 21b and 21c. Mode 7 is a mode for setting the volume of sound of the alarm sound. The present device is allowed to set the volume of sound at the two steps, HI (large) and LO (small). The status of the level of the sound volume thus set is displayed on the 7-segment LED's 21*b* and 21*c*. In addition to the modes for the user's setting described above, the present device is furnished with a standard mode for allowing the car-to-car distance measured during the operation of the device to be displayed in units of 1 m, for example, on the 7-segment LED's 21*a*–21*c*. This standard mode is set immediately after the power source has been turned on or it is set each time the mode selecting switch 23*a* is depressed once from the status of Mode 7 for the user's setting. Specifically, whenever the mode selecting switch 23*a* is depressed once at a time, the mode is switched sequentially in the order of standard mode→Mode 1→Mode 2→Mode 3→Mode 4→Mode 5→Mode 6→Mode 7→standard mode, for example.

FIG. 4 explains the contents of the car-to-car distance alarm.

This embodiment contemplates broadly dividing the car-to-car distance alarm into a car-to-car alarm in the broad sense of the word which does not require such measure as application of brakes and a rear-end collision alarm which requires such measure as application of brakes. Then, the car-to-car alarm in the broad sense of the word is divided first by the degree of danger of collision into a car-to-car danger alarm (a car-to-car alarm in the narrow sense of the word) and a car-to-car alert alarm and the car-to-car alert alarm is likewise divided into two kinds. When the rear-end collision alarm is issued, the red LED 22*c* is flickered (display of rear-end collision alarm) and the speaker 25 emits a sound of alarm where the sound of alarm of the rear-end collision alarm has been set to the ON status. When the car-to-car danger alarm is issued, the red LED 22*c* is lighted (display of car-to-car danger alarm) and the speaker 25 emits a sound of alarm where the sound of alarm of the car-to-car alarm has been set to the ON status. When the car-to-car alert alarm is issued, the orange LED 22*b* is lighted where the degree of danger is on the higher side in the two steps or the green LED 22*a* is lighted where the degree of danger is on the lower side (display of car-to-car alert alarm). No sound of alarm is emitted in the case of the car-to-car alert alarm. Incidentally, when the brakes happen to be applied during the life of the rear-end collision alarm or the car-to-car danger alarm, the present device forbids the emission of a sound of alarm even where the sound of alarm has been set to the ON status.

Now, the operation of this car-to-car distance alarm device will be described below with reference to the flow charts of FIG. 5–FIG. 16.

FIG. 5 is a main flow chart schematically illustrating the operation of the operation processing part 9 shown in FIG. 1.

When the power source is turned on by the power source ON/OFF switch 24 and the device is set to the standard mode, measurement of distance is first carried out at the step S1. In this measurement of distance, the near infrared laser beam is emitted in six directions as shifted by one degree (°) at a time to measure the distances of objects for measurement in the six directions. This measurement of distance in the six directions is performed up to two repetitions a brief interval apart.

Next, the data obtained at the step S1 is processed (step S2) and the resultant data is used for discriminating the kind of each of the objects for measurement (step S3). This operation, in brief, consists in comparing the changes of distances found in the first and the second measurement in the same directions with the distance of travel of the user's own automobile thereby discriminating whether each of them is a moving object (an automobile such as a four-wheeler and two-wheeler in motion etc.) or a fixed object (a vehicle at rest, obstacle, etc.) and, when the presence of the fixed object is confirmed, discriminating whether the fixed object is a small obstacle or large one, depending on whether the fixed object is present in not less than three of the total of six directions and, when it is found as the large obstacle, regressing the distance data and finding the standard deviation, and judging whether those fixed objects are exclusively nonobstacles such as guardrails or includes other obstacles, depending on the magnitude of the found standard deviation.

Thereafter, the question as to whether or not the objects for measurement found at the step S3 include those satisfying the condition for executing the decision on danger which will be described specifically herein below is judged at the step S4. When the answer is YES, the processing for judging danger is carried out (step S5) and the processing for displaying an alarm (step S6) is carried out in accordance with the result consequently obtained. When the answer is NO, the flow of the process advances immediately to the step S7. Incidentally, the processing for judging danger at the step S5 is intended, as will be described afterward, to execute the judgment of danger, depending on the kind of an object for measurement and further divide the alarm into a car-to-car alarm and a rear-end collision alarm on each occasion and emit these alarms by using two kinds of formula of decision.

The series of processing described above is repeated until completion of the series is indicated (step S7).

Now, the contents of the sub-routines mentioned above will be described in detail below.

FIG. 6 is a flow chart of the process for measurement of distance shown in FIG. 5.

First in this processing for measurement of distance, the infrared laser beam is emitted from the projector 1 in six directions to effect the first measurement of distance in six directions, the data of distance in the six directions $L_{11}$, $L_{21}$, $L_{31}$, $L_{41}$, $L_{51}$, and $L_{61}$ consequently obtained are stored in the memory (RAM; similarly applicable hereinafter) (step S1), and the own car's speed $v_1$ during the first measurement is detected by the own car's speed detecting part 8 and then stored in the memory (step S12). Then, the second measurement of distance in the six directions is executed after an interval of a brief time, the data of distance in the six directions $L_{12}$, $L_{22}$, $L_{32}$, $L_{42}$, $L_{52}$, and $L_{62}$ consequently obtained are stored in the memory (step S13), and the own car's speed $v_2$ during the second measurement is detected by the own car's speed detecting part 8 and stored in the memory (step S14).

Figure 7:
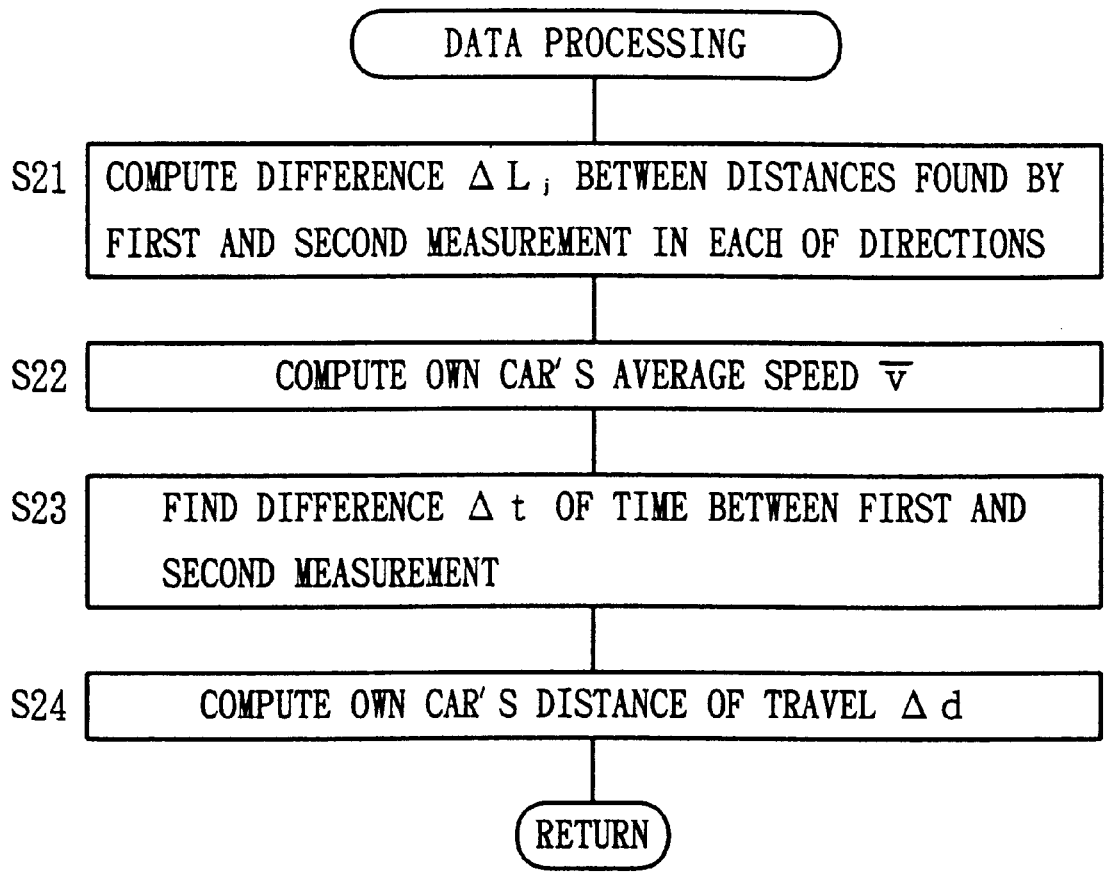
FIG. 7 is a flow chart of the data processing shown in FIG. 5.

FIG. 7 is a flow chart of the data processing shown in FIG. 5.

In this data processing, first the difference $\Delta L_j$ (j=1, 2, . . . , 6) between the distances obtained in the first and the second measurement in each of the directions is computed by the following formula, $$\Delta L_j = L_{j1} - L_{j2} \ (j=1, 2, \ldots, 6)$$

and the result of the computation is stored in the memory (step S21). Then, the own car's average speed $\bar{v}$ during the first and the second measurement is computed by the following formula (step S22), $$\bar{v} = (v_1 + v_2)/2$$

and the difference of brief time $\Delta t$ during the first and the second measurement is found (step S23), the distance of own car's travel Δd during the first and the second measurement is computed by the following formula, $$\Delta d = v \times \Delta t$$

and the result of this computation is stored in the memory (step S24).

Figure 8:
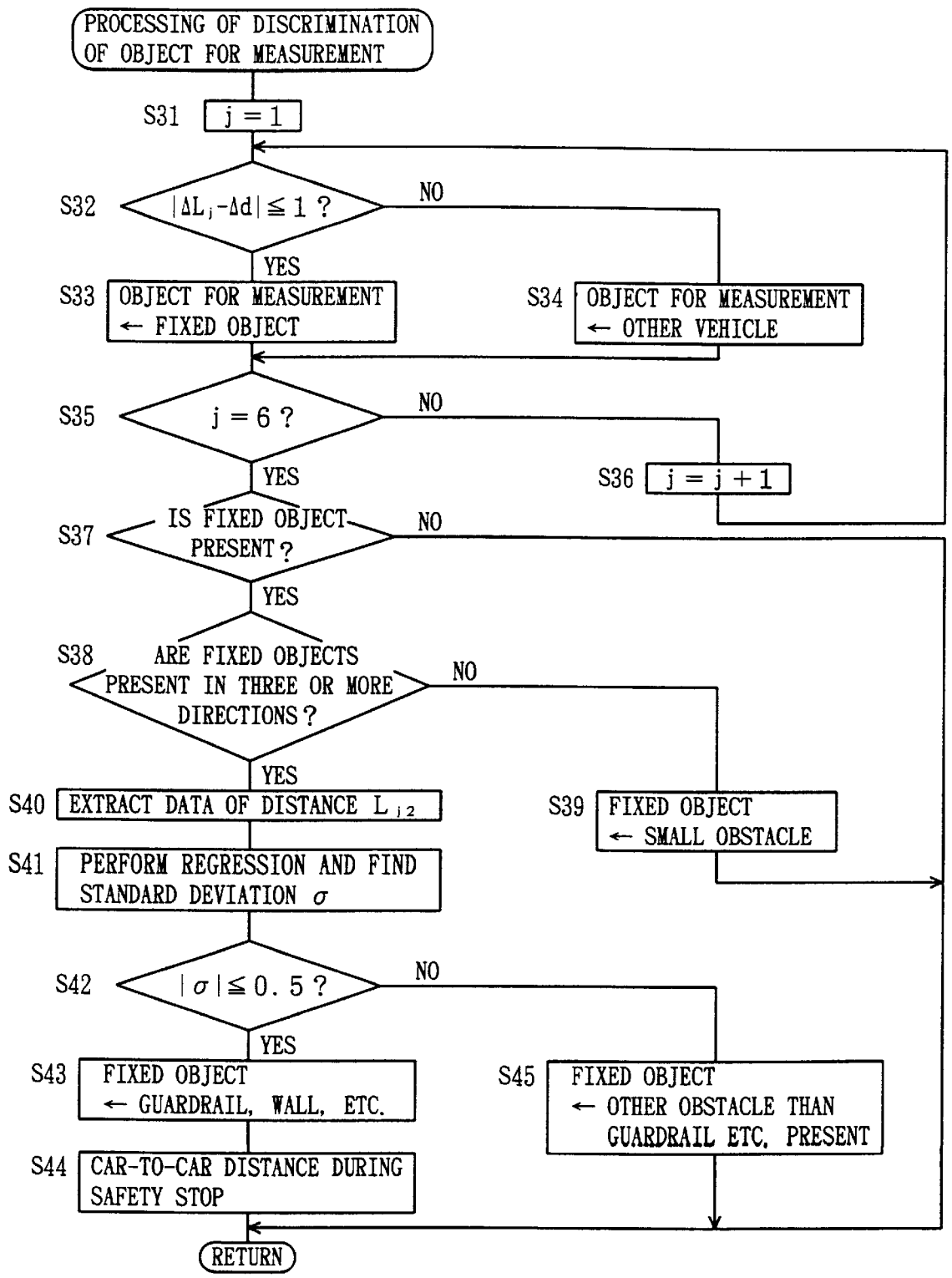
FIG. 8 is a flow chart of the processing of discrimination performed on an object for measurement shown in FIG. 5.

FIG. 8 is a flow chart of the processing of discrimination of an object for measurement shown in FIG. 5.

In this processing for discrimination of an object for measurement, first the j value which is a parameter representing a direction is set at 1 (step S31), the change of distance between the first and the second measurement in the direction j found at the step S21 is compared with the distance of the own car's travel Δd found at the step S24, and the question as to whether or not the absolute value of the difference between the two distances ($|\Delta L_j - \Delta d|$) is not more than a prescribed value (1 m, for example) is judged (step S32). When the judgment derives YES as the answer, the object for measurement is judged to be a fixed object incapable of motion (step S33) because the own car ought to have traveled over substantially the change of the measured distances. When the judgment derives NO as the answer, the object for measurement is judged to be a moving object such as other vehicle (step S34). Since it is safe to conclude that most moving objects on a road are other vehicles, the following description presumes other vehicle as a moving object.

When the step S33 or the step S34 is completed, the question whether or not the j value is 6 is judged (step S35) and the flow of the process advances to the step S37 when the answer is in the affirmative. When the answer is in the negative, the j value is incremented by 1 (step S34) and the flow of process returns to the step S32. With respect to all the six directions involved in the measurement, the question whether the relevant object for measurement is a fixed object or other vehicle is judged. The result of this judgment is stored in the memory as related at least with the data of distance $L_{12}$–$L_{62}$ obtained by the second measurement.

When the processing of discrimination is completed with respect to each of the six directions, the question whether or not a fixed object exists in the six directions is judged at the subsequent step S37. When the judgment derives YES as the answer, the flow of process advances to the step S38 to discriminate the kind of the fixed object more specifically. When the judgment derives NO as the answer, namely when nothing but other vehicle is detected, the process immediately returns and shifts to the processing for judgment of danger.

When a fixed object is present, the question whether or not the fixed object exists in not less than three, for example, of the total of six directions is judged first at the step S38. When the judgment derives NO as the answer, the fixed object is judged to be a small obstacle (step S39) because this fixed object exists only in two directions at most in all the six directions. The process immediately returns and shifts to the processing for judgment of danger.

When the judgment at the step S38 derives YES as the answer, the fixed object is judged to be a large obstacle because it is present in not less than three of the total of six directions. Subsequently, the question as to whether this fixed object is exclusively a nonobstacle such as a guardrail which does not obstruct the own car's travel or includes besides that an obstacle which obstructs the own car's travel is discriminated.

Specifically, the second data of distance $L_{j2}$ which is judged to be a fixed object is extracted from the memory (step S40), the extracted data of distance $L_{j2}$ is regressed to compute the standard deviation a (step S41) and the question whether or not the found standard deviation a is not more than a prescribed value (0.5, for example) is judged (step S42). When this judgment derives YES as the answer, this fixed object is judged to be an on obstacle such as a guardrail, road sign, slope of a mountain, or wall of a building because the detected fixed object shows only a sparing dispersion of position and is consequently judged to be smoothly bent or straight and the result of this judgment is stored in the memory (step S43). When the judgment derives NO as the answer, this fixed object is judged to include at least besides such as a guardrail an obstacle which obstructs the own car's travel because it shows too large a dispersion of position to justify a conclusion that it is exclusively such as a guardrail (step S45). In the former case, the car-to-car distance d during a safety stop which is used for the computation of the safety car-to-car distance as will be more specifically described hereinafter is set at 0.2 times the standard value (refer to the diagram of FIG. 20) (step S44) because this fixed object is exclusively such as a guardrail and forms no obstacle to the own car's travel. When the object for measurement is then on obstacle such as a guardrail, therefore, the possible occurrence of an erroneous alarm due to such as a guardrail is markedly reduced because the safety car-to-car distance is so short as to render the issuance of an alarm difficult. In contrast, in the latter case, the process immediately returns without any modification and shifts to the processing for judgment of danger because the obstacle other than such as a guardrail is in need of ordinary judgment of danger. The correction of the car-to-car distance d during a safety stop at the step S44 may be carried out when the safety car-to-car distances D, $D_1$, and $D_2$ are computed as described specifically herein below.

Figure 17:
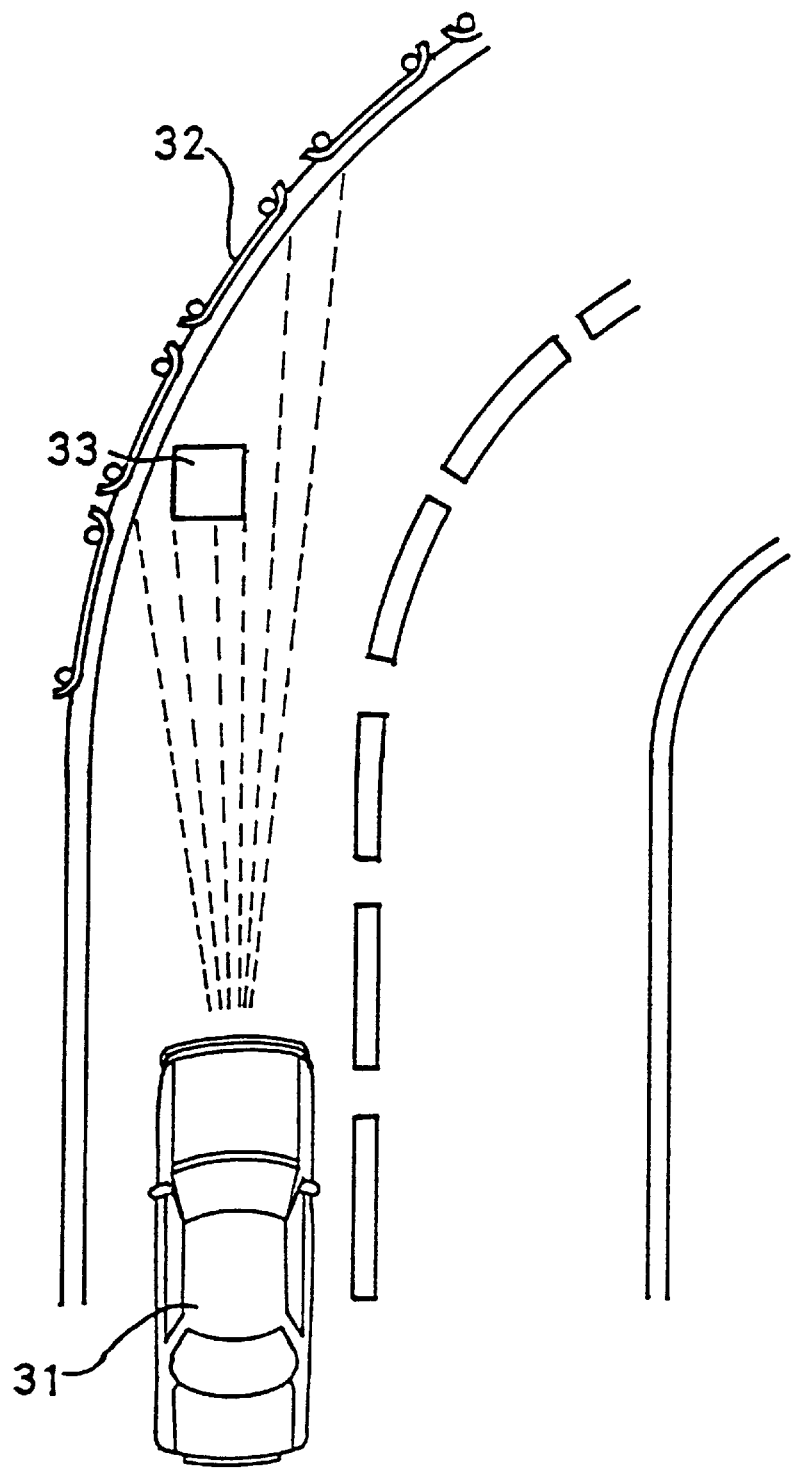
FIG. 17 is a diagram to aid in the description of the processing of discrimination performed on an object for measurement which is in the situation of traveling along a curve in a road.
Figure 18:
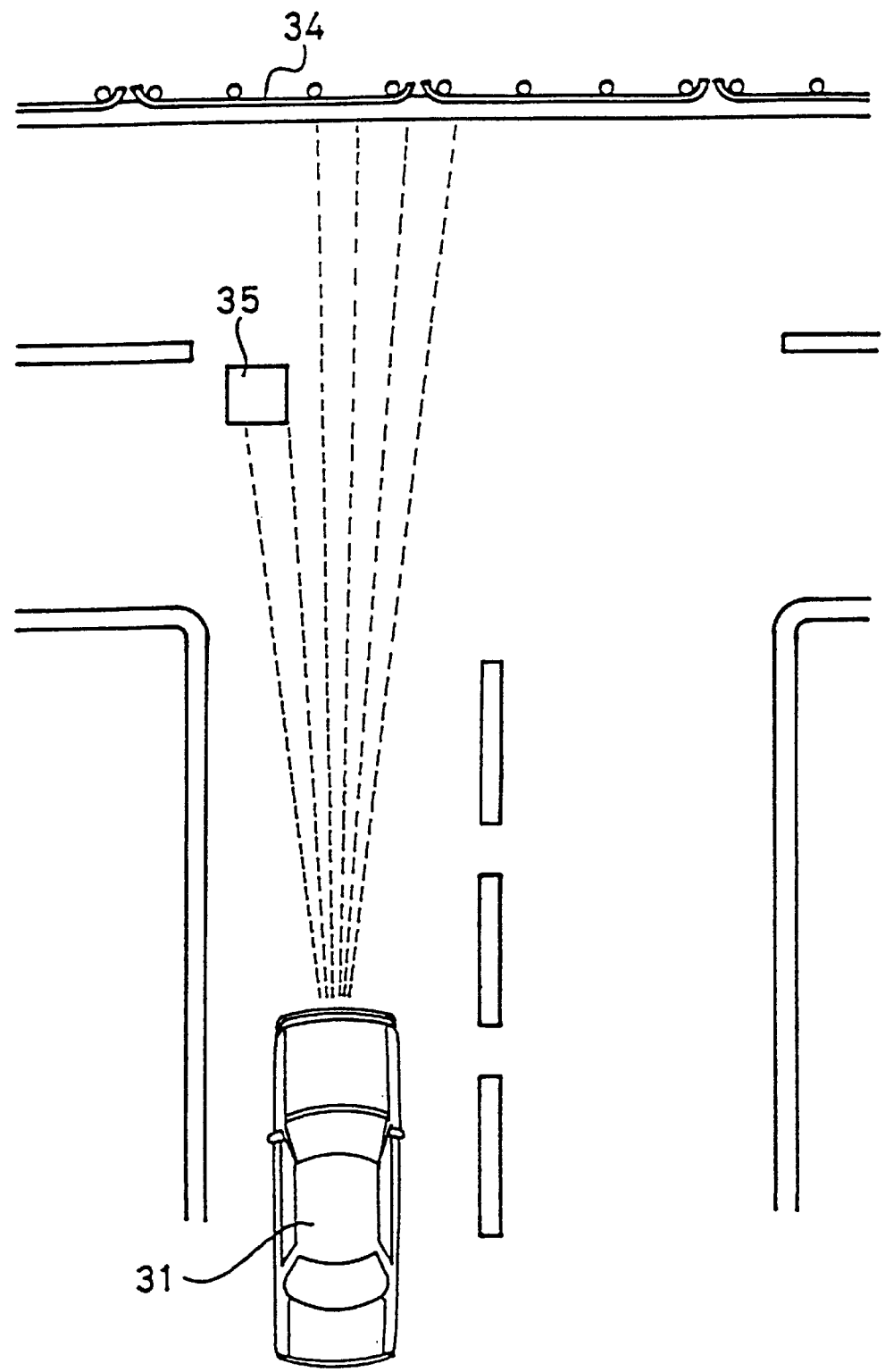
FIG. 18 is a diagram to aid in the description of the processing of discrimination performed on an object for measurement which is in the situation of traveling along a corner of a T road.

When an obstacle 33 exists on the foreground of a guardrail 32 ahead the center of an own automobile 32 in a curve of a road as illustrated in FIG. 17, for example, the standard deviation a computed by regressing the data of distance $L_{j2}$ (j=1, 2, . . . , 6) determined in all the six directions turns out to be a large magnitude (absolute value) because of a dispersion of data due to the presence of the obstacle 33 on the foreground. Thus, the obstacle 33 on the foreground of the guardrail 32 can be detected (step S45) by the judgment at the step S42. By the same token, when an obstacle 35 exists on the foreground of a straight guardrail 34 ahead the left side of an own automobile 31 in a T road as illustrated in FIG. 18, the standard deviation a computed by regressing the data of distance $L_{j2}$ (j=1, 2, . . . , 6) determined in the six directions turns out to be a large magnitude (absolute value) because of the presence of the obstacle 35 on the foreground. Thus, the obstacle 35 on the foreground of the guardrail 34 can be detected (step S45) by the judgment at the step S42. If the obstacle 33 or 35 does not exist in the situation of FIG. 17 or FIG. 18, the guardrail 32 or 34 is exclusively detected in front of the own car 31 (Step S43) by the judgment of the step S42 because the standard deviation a obtained by regressing the data of distance $L_{j2}$ (j=1, 2, . . . , 6) measured in the six directions turns out to be a small magnitude.

When the processing for discrimination of the kind of an object for measurement is completed as described above, the question whether the detected objects for measurement include those which fulfill the condition for the execution of judgment of danger is judged at the step S4 shown in FIG. 5. This condition for the execution of judgment of danger forms the basis for judging whether or not the judgment of danger is actually necessary and consists in preparatorily setting a prescribed area with the directions (angles) and distances of the beams to be emitted and carrying out judgment of danger with respect exclusively to objects which happen to exist within the area. This setting of the area, for example, may be implemented with emphasis laid on such objects as fall on the same lane that the own car travels on. Let Direction 1, Direction 2, Direction 3, Direction 4, Direction 5, and Direction 6 reckoned sequentially from the left side onward stand for the directions of scan of the beam, for example, and the areas will be so set that an area of 25 m is assigned to each of the laterally outermost directions, i.e. Direction 1 and Direction 6, an area of 40 m to each of the inwardly adjoining directions, i.e. Direction 2 and Direction 5, and an area of 100 m to each of the central directions, i.e. Direction 3 and Direction 4.

At the step S4, therefore, the question whether or not an object for measurement answering any one of these expressions, $L_{12}<25$ m, $L_{22}<40$ m, $L_{32}<100$ m, $L_{42}<100$ m, $L_{52}<40$ m, and $L_{62}<25$ m exists is judged based on the data of distance, $\Delta L_{j2}$ (j=1, 2, ..., 6), obtained in the second and consequently newer measurement in the total of two measurements to be involved. When this judgment derives YES as the answer, all the objects for measurement that answer the relevant expressions are picked up and stored in the memory. When the judgment derives NO as the answer, the flow of process immediately advances to the step S7 because all the objects for measurement fall at such positions as form no obstacle to the own car's travel and no judgment of danger is required.

Figure 9:
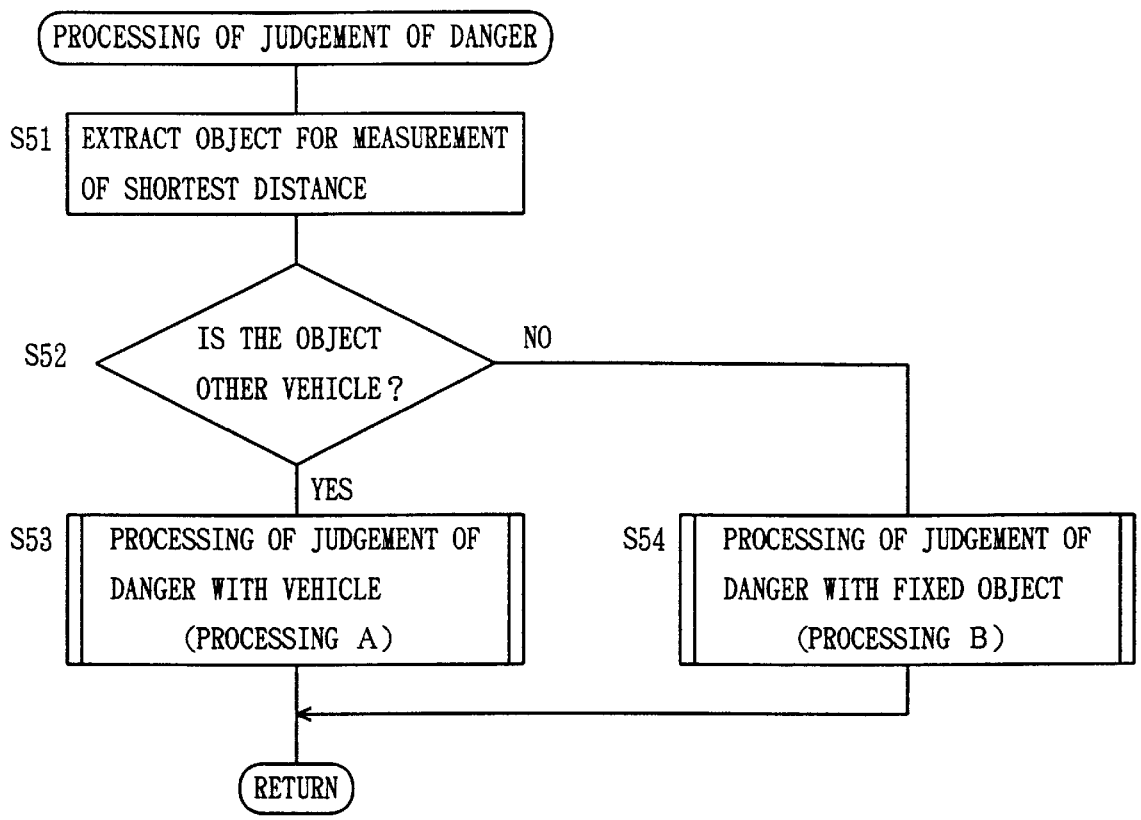
FIG. 9 is a flow chart of the processing of judgment of danger shown in FIG. 5.

FIG. 9 is a flow chart of the processing of judgment of danger shown in FIG. 5.

In this processing for judgment of danger, first the objects for measurement answering the condition for execution of judgment of danger found at the step S4 are surveyed to extract the object having the smallest distance $L_{j2}$ of measurement (step S51) and the question whether or not the extracted object for measurement is other vehicle (step S52). When this judgment derives YES as the answer, the program for judgment of danger with respect to a vehicle is executed (step S53). When the judgment derives NO as the answer, namely when the object for measurement is a fixed object, the program for judgment of danger with respect to a fixed object is carried out (step S54).

Though the process, as described above, contemplates executing the processing for judgment of danger exclusively with respect to the object for measurement approximating most closely to the own car among other objects for measurement which answer the condition for execution of judgment of danger, it does not need to be limited to this particular mode. Where other vehicles and fixed objects coexist, for example, it is permissible to judge danger with respect severally to these items and then display an alarm with respect to the item which has been judged to have the highest degree of danger.

Figure 10:
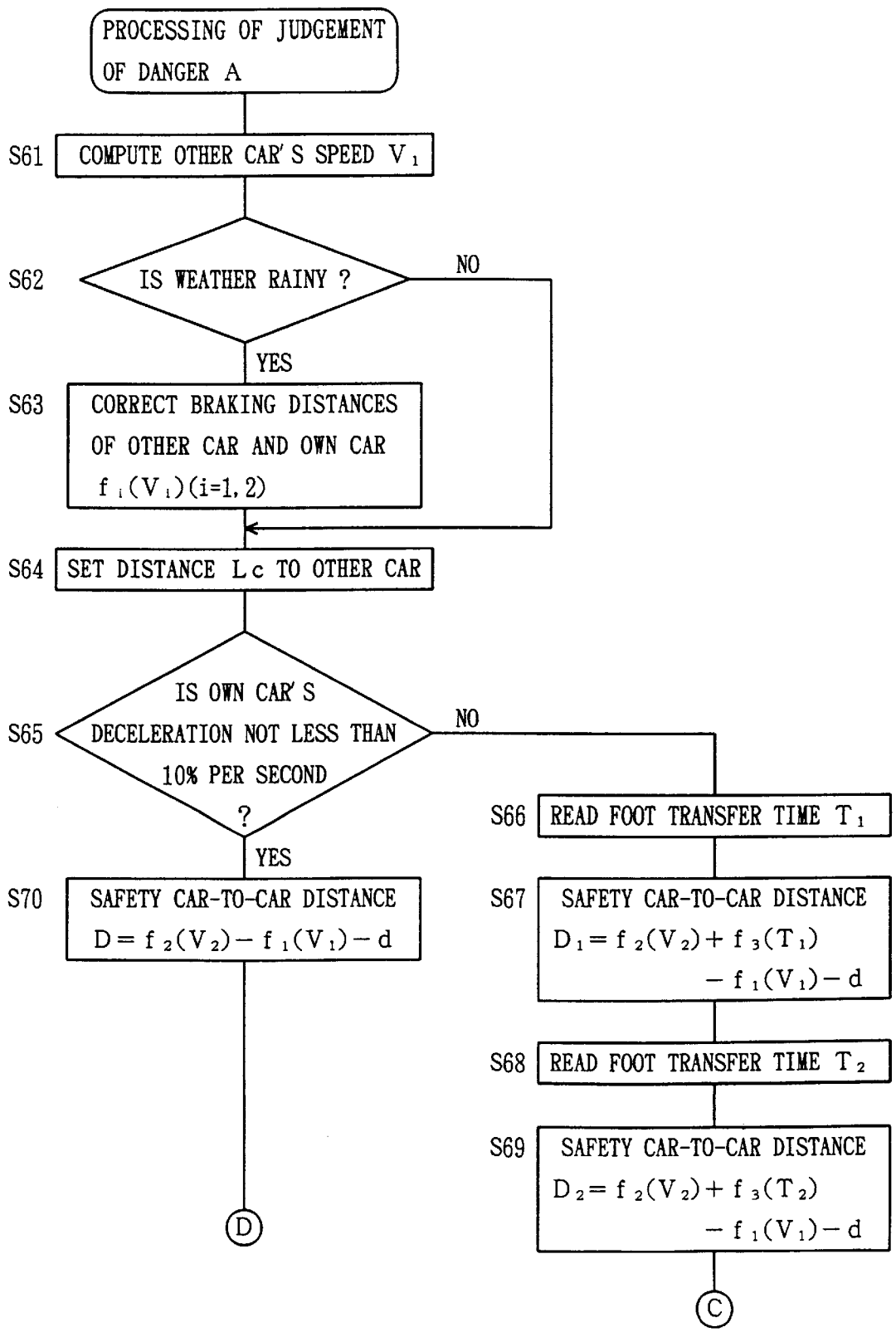
FIG. 10 is a flow chart of the processing of judgment of danger regarding a vehicle shown in FIG. 9.
Figure 11:
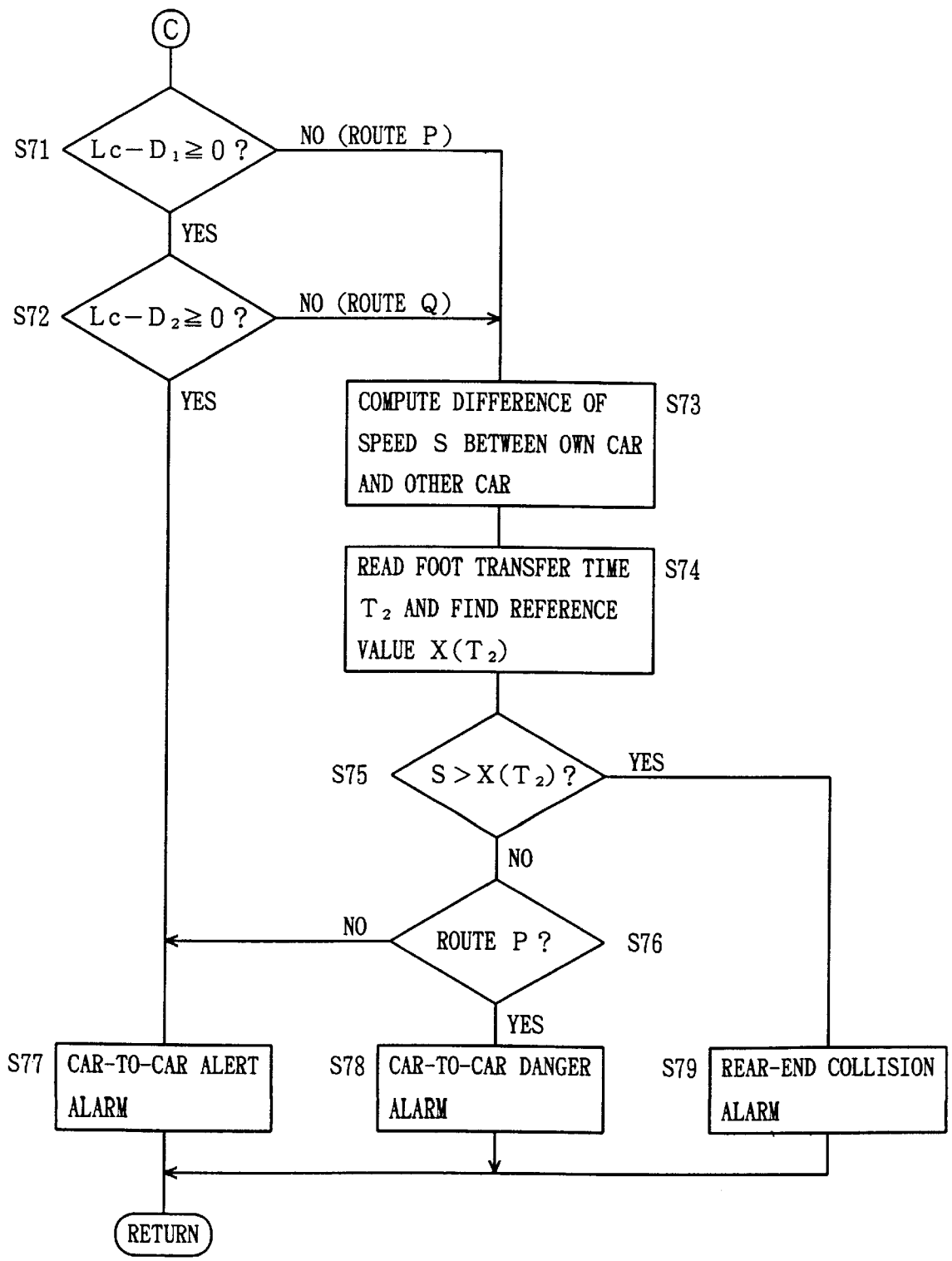
FIG. 11 is a flow chart continuing to step S69 in the flow chart shown in FIG. 10.
Figure 12:
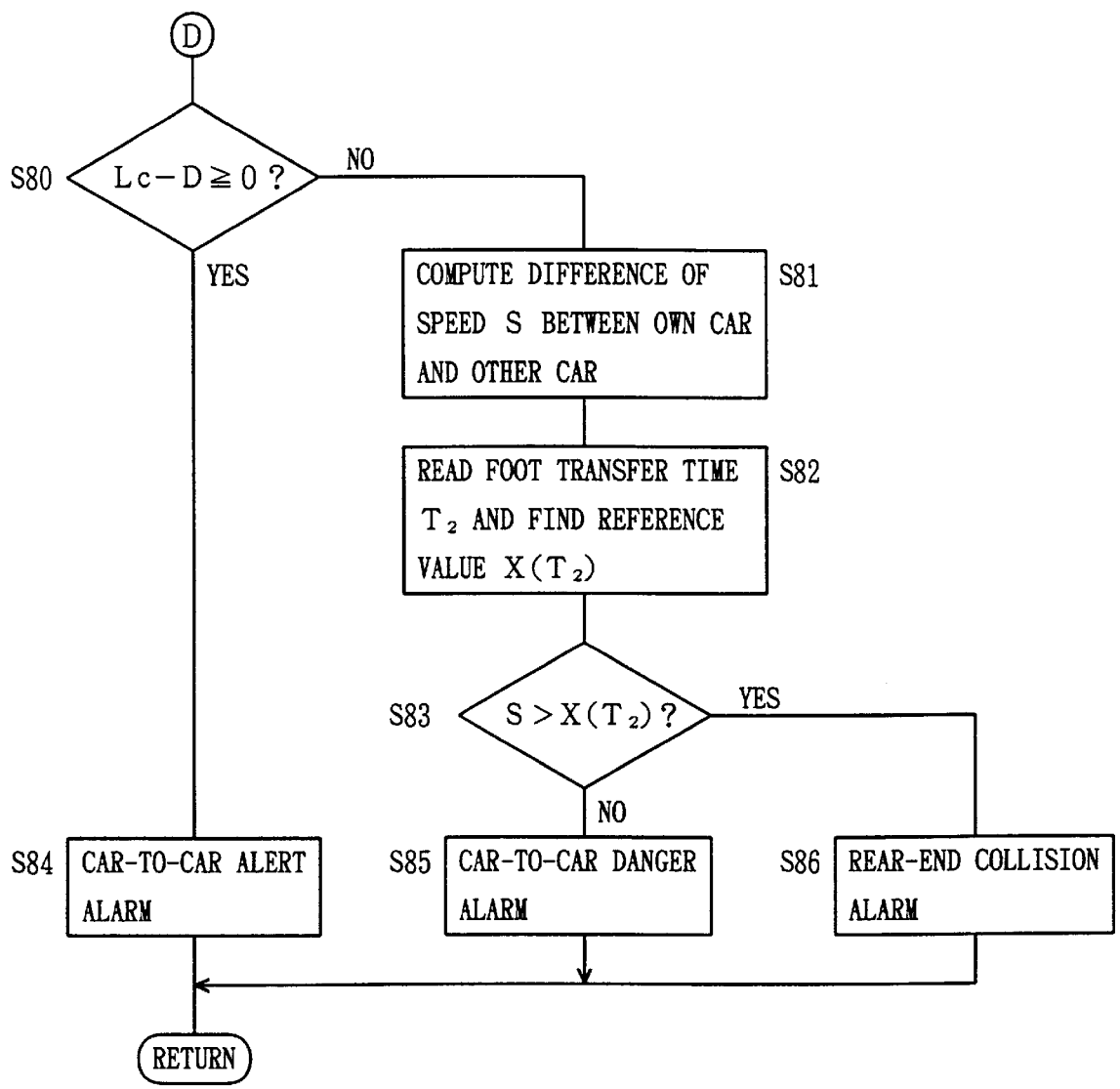
FIG. 12 is a flow chart continuing to step S70 in the flow chart shown in FIG. 10.

FIG. 10–FIG. 12 are flow charts of the processing for judging danger with respect to a vehicle shown in FIG. 9.

In this processing for judging danger with respect to a vehicle, first the speed $V_1$ of other vehicle ahead of the own car is computed by the following formula (step S61).

$$V_1 = V_2 + \Delta L_j/\Delta t$$

wherein
- $V_2$: own car's speed (the own car's speed $v_2$ during the second measurement detected at the step S14, for example, may be used)
- $\Delta L_j$: difference of distances found in the first and the second measurement in the direction j of the relevant other vehicle (the value found at the step S21 may be used)
- $\Delta t$: difference of time between the first and the second measurement (the value found at the step S23 may be used)

Then, the question whether or not the weather is rainy (step S62). When the weather is found to be rainy, the braking distance $f_1$ ($V_1$) of other vehicle and the braking distance $f_2$ ($V_2$) of the own car are severally corrected, for example, to 1.5 times the standard value (FIG. 19 refers) (step S63) because the road has a slippery surface. As a result, this device is adapted to the actual situation of the road. The term "braking distance f(V)" of a vehicle means the distance over which the vehicle travels between the time the brakes are applied and the time the vehicle is ultimately stopped. This distance varies with the speed V of vehicle. The magnitude of the braking distance f(V) is properly set in advance by using as a parameter thereof the speed V of vehicle determined empirically with respect to the standard situation which excludes the factor of rainy weather. FIG. 19 depicts one example of the set of braking distances. The data of the braking distance f(V) which is set for a particular automobile furnishes more accurate information. Where the weather is not rainy, the flow of process immediately advances to the step S64 because the braking distance f(V) does not need to be corrected.

At the next step S64, the distance Lc to other car is set. Specifically, the distance $L_{j2}$ to the relevant other car found in the second measurement in the direction J is used as the value of the distance Lc.

Thereafter, the question whether or not the own car's deceleration is not less than 10% per second is judged (step S65). This judgment is carried out in accordance with the following formula, for example.

$$(v_1 - v_2)/\Delta t \geq 0.1$$

When the own car's deceleration is less than 10% per second, the device judges that the driver has not yet noticed the presence of other car and has not applied brakes and computes the safety car-to-car distance D by taking into account the free running distance $f_3(T)$ due to the time of delay of the driver's reaction (foot transfer time) T. In this invention, since the car-to-car alarm and the rear-end collision alarm are judged as discrminated, the safety car-to-car distance $D_1$ which takes into account the foot transfer time $T_1$ for car-to-car alarm and the safety car-to-car distance $D_2$ which takes into account the foot transfer time $T_2$ for rear-end collision alarm are computed separately of each other. Incidentally, the free running distance $f_3(T)$ is computed in accordance with the following formula.

$$f_3(T) = V_2 \times T$$

Specifically, the foot transfer time $T_1$ for car-to-car alarm which is set by the user is read out of the memory (step S66), the safety car-to-car distance $D_1$ taking into account the foot transfer time $T_1$ for car-to-car alarm is computed in accordance with the following formula (step S67), $$D_1 = f_2(V_1) + f_3(T_1) - f_1(V_1) - d$$

and the foot transfer time $T_2$ for rear-end collision alarm similarly set by the user is read out of the memory (step S68), the safety car-to-car distance $D_2$ taking into account the foot transfer time $T_2$ for rear-end collision alarm is computed in accordance with the following formula (step S69), and the flow of process is advanced to the next step S71.

$$D_2 = f_2(V_2) + f_3(T_2) - f_1(V_1) - d$$

wherein $f_1(V_1)$: braking distance of other vehicle $f_2(V_2)$: own car's braking distance $f_3(T_1)$: free running distance due to foot transfer time $T_1$ $f_3(T_2)$: free running distance due to foot transfer time $T_2$ d: car-to-car distance during safety stop Incidentally, the car-to-car distance d during a safety stop is a car-to-car distance which exists when the own car is stopped safely and it varies with the own car's speed $V_2$. This magnitude is properly set in advance by using as a parameter thereof the empirically determined vehicle speed V. FIG. 20 depicts one example thereof.

When the own car's deceleration is found to be not less than 10% per second by the judgment of the step S65, since the own car is judged to be already in the process of deceleration initiated such as by the application of brakes and consequently to be not in need of taking into account the free ruuning distance $f_3(T)$, the safety car-to-car distance D is computed in accordance with the following formula (step S70) and the flow of process is advanced to the next step S80.

$$D = f_2(V_2) - f_1(V_1) - d$$

When the own car's deceleration is less than 10% and the setting of two safety car-to-car distances $D_1$ and $D_2$ has been completed, the question whether or not the distance Lc to other car set at the step S64 is not less than the safety car-to-car distance $D_1$ determined at the step S67, namely the question whether or not the following formula (hereinafter referred to "first formula A of decision") is fulfilled, is judged at the next step S71.

$$Lc - D_1 \geq 0$$

When this judgment derives NO as the answer (route P), the flow of process immediately advances to the step S73. When the judgement derives YES as the answer, further, similarly the question whether or not the distance Lc to another car is not less than the safety car-to-car distance $D_2$ found at the step S69, namely whether or not the following formula (hereinafter referred to as "first formula B of decision") is satisfied, is judged (step S72).

$$Lc - D_2 \geq 0$$

When this judgment derives YES as the answer, the car-to-car alert alarm is selected (step S77) because the degree of danger is not very high without reference to the choice between the foot transfer times $T_1$ and $T_2$ for the sake of consideration. The car-to-car alert alarm comes in two steps, i.e. a green color and an orange color, as described above (FIG. 4 refers). Further, as regards the choice between these two steps of alarm, the time allowed for applying the brakes is computed backward from the difference ($Lc-D_1$) between the distance Lc to other car and the safety car-to-car distance $D_1$ and the car-to-car alert alarm in the green color is selected when the found time allowance is not less than ($T_1$+1.5) seconds or the car-to-car alert alarm in the orange color is selected when the time allowance is not less than ($T_1$+0.5) seconds and less than ($T_1$+1.5) seconds. In contrast, the judgment derives NO as the answer (route Q), the flow of process advances to the step S73.

At the step S73, the difference of speed S ($=V_2-V_1$) between the own car and the other car is computed. At the next step S74, the foot transfer time $T_2$ for rear-end collision alarm is read out of the memory and the reference value $X(T_2)$ for comparison is found. The reference value $X(T_2)$ is a set value which varies with the foot transfer time $T_2$. In view of the undeniable possibility of collision, it is properly set in advance empirically. FIG. 21 depicts one example thereof.

Then, at the subsequent step S75, the question whether the difference of speed S found at the step S73 is greater than the reference value $X(T_2)$ found at the step S74, namely whether the following formula (hereinafter referred to as the "second formula of decision") is fulfilled, is judged.

$$S > X(T_2)$$

When this judgment derives YES as the answer, the rear-end collision alarm is selected (step S79).

In contrast, when the judgment derives NO as the answer, the question whether or not the route reaching the judgment of step S75 is P, namely the question whether the judgment at the step S71 has derived NO or the judgment at the step S72 has derived NO, is judged (step S76). When this judgment derives route P as the answer, the car-to-car alert alarm is selected (step S78) because the degree of danger is not very high, notwithstanding the distance Lc to other car is so smaller than the safety car-to-car distance $D_1$ ($Lc < D_1$) as to suggest necessity for alerting the driver. In contrast, the judgment derives route Q as the answer, the car-to-car alert alarm is selected (step S77) because this judgment occurs when YES is selected at the step S71, namely when the distance Lc to the other car is not less than the safety car-to-car distance $D_1$ due to the foot transfer time $T_1$ for car-to-car alarm ($Lc \geq D_1$), and further because the car-to-car alarm is judged on the basis of the foot transfer time $T_1$.

In short, the question whether a rear-end collision alarm is issued, a car-to-car danger alarm is issued, or a car-to-car alert alarm is issued is judged in accordance with the first formula of decision ($Lc - D_1 \geq 0$ and $Lc - D_2 \geq 0$) and the second formula of decision ($S > X(T_2)$). Moreover, the user can freely adjust the timing for issuing the car-to-car alarm and the rear-end collision alarm separately of each other because the foot transfer time $T_1$ for car-to-car alarm and the foot transfer time $T_2$ for rear-end collision alarm can be designated separately of each other by the user as described above. Accordingly, when the user sets the foot transfer time $T_1$ for car-to-car alarm at a level shorter than the driver's own actual speed of reaction with due respect to the possibility of traffic congestion, for example, the rear-end collision alarm is infallibly issued in case of genuine need so long as the foot transfer time $T_2$ for rear-end collision alarm is set at the driver's own actual speed of reaction (the route of steps S71→S72→S73→S74→S75→S79), notwithstanding the car-to-car danger alarm accompanied by the sound of alarm is issued only with difficulty (in which case the process will probably follow chiefly the route of steps S71→S72→S73→S74→S75→S76→S77).

Meanwhile, basically the same process is carried out even when the own car's deceleration is not less than 10% and yet the setting of the safety car-to-car distance D has been completed. At the subsequent step S80, the question whether or not the distance to other car Lc set at the step S64 is not less than the safety car-to-car distance D found at the step S70, namely whether or not the following formula (first formula of decision) is satisfied, is judged.

$$Lc - D \geq 0$$

When this judgment derives YES as the answer, the car-to-car alert alarm is selected (step S84). Here, the operation for deciding between the selection of the car-to-car alert alarm of the green color and the selection of the car-to-car alert alarm of the orange color is performed similarly in the former case. In contrast, when the judgment derives NO as the answer, the difference of speed S (=$V_2$−$V_1$) between the own car and the other car is computed (step S81), the reference value X($T_2$) is found by reading the foot transfer time $T_2$ for rear-end collision alarm out of the memory (step S82), and the question whether or not the difference of speed S is greater than the reference value X ($T_2$), namely the question whether or not the following formula (second formula of decision) is satisfied, is judged.

$$S > X(T_2)$$

When this judgment derives YES as the answer, the rear-end collision alarm is selected (step S86). When the judgment derives NO as the answer, the car-to-car danger alarm is selected (step S85).

Figure 13:
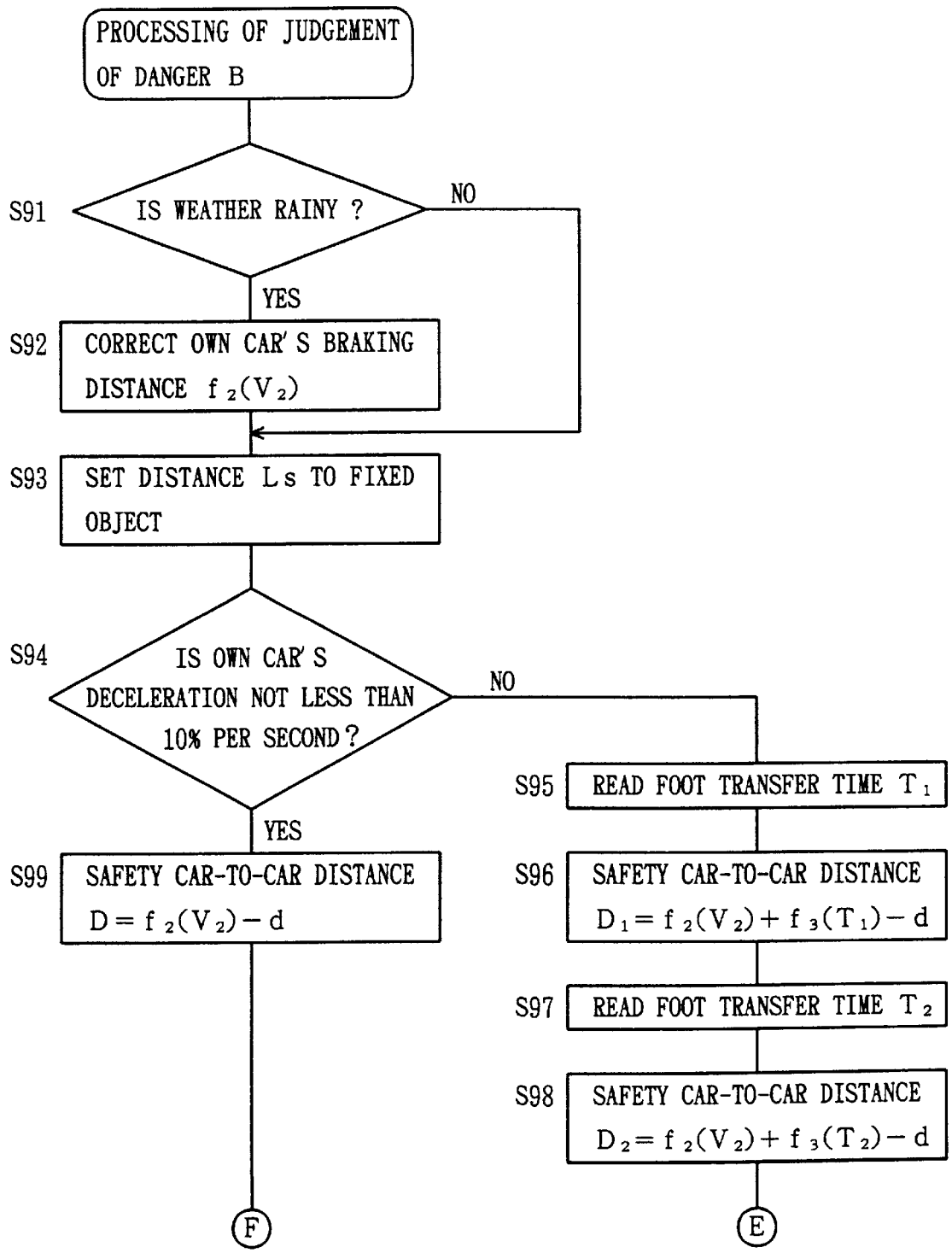
FIG. 13 is a flow chart of the processing of judgment of danger regarding a fixed object shown in FIG. 9.
Figure 15:
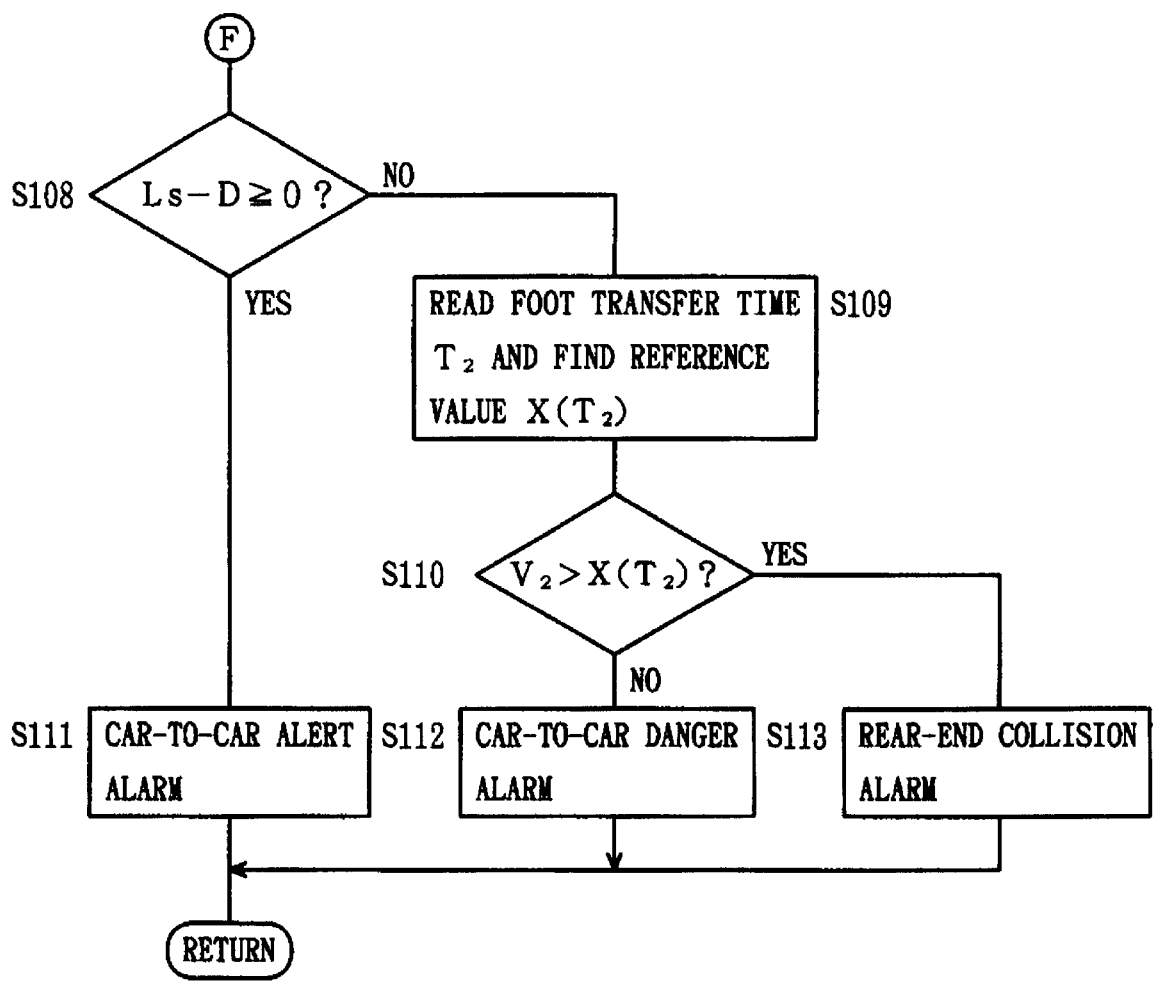
FIG. 15 is a flow chart continuing to step S99 in the flow chart shown in FIG. 13.

FIG. 13–FIG. 15 are flow charts of the processing for judging danger with respect to a fixed object shown in FIG. 9.

Basically, these flow charts are entirely the same as those of the processing for judging danger with respect to a vehicle shown in FIG. 10–FIG. 12. Since it differs only in that the fixed object does not need to consider the speed (the case of the speed of the other car $V_1$=0 is conceivable) and that the corrected d value (step S44 in FIG. 8 refers) is used when the fixed object happens to be such as a guardrail, the further description will be contracted to the following brief explanation.

First, the question whether or not the weather is rainy (step S91) is judged. When this judgment derives YES as the answer, the own car's braking distance $f_2(v_2)$ is corrected, for example, to 1.5 times the standard value (FIG. 19 refers) (step S92). Then, the distance Ls to the fixed object is set (step S93). The distance Ls in this case has the magnitude of the distance $L_{j2}$ of the fixed object found in the second measurement in the direction j.

Thereafter, the question whether or not the own car's deceleration is not less than 10% is judged (step S94). When this judgment derives NO as the answer, for the purpose of drawing the judgment of danger taking into account the foot transfer time, the foot transfer time $T_1$ for car-to-car alarm is read out (step S95), the safety car-to-car distance $D_1$ is computed by the following formula (step S96), $$D_1 = f_2(V_2) + f_3(T_1) - d$$

then, the foot transfer time $T_2$ for rear-end collision alarm is read out (step S97) and the safety car-to-car distance $D_2$ is computed by the following formula (step S98).

$$D_2 = f_2(V_2) + f_3(T_2) - d$$

In contrast, when the judgment derives NO as the answer, the safety car-to-car distance D is computed by the following formula (step S99) because the deceleration has been already proceeding and the foot transfer time does not need to be taken into account.

$$D = f_2(V_2) - d$$

As respects to the value of d to be used in the formula given above (the car-to-car distance involved at the time of safety stop), the value resulting from correcting the standard value (FIG. 20 refers) (step S44 in FIG. 8 refers) is used as already described in order that the alarm is not easily issued when the fixed object happens to be a guardrail etc.

When the setting of the safety car-to-car distances $D_1$ and $D_2$ is completed where the own car's deceleration is less than 10%, the question whether or not the distance Ls to the fixed object is not less than the safety car-to-car distance $D_1$, namely whether or not the following formula (first formula A of decision) is satisfied, is judged (step S100).

$$Ls - D_1 \geq 0$$

When this judgment derives NO as the answer (route P), the flow of process immediately advances to the step S102. When the judgment derives YES as the answer, further, similarly the question whether or not the distance Ls to the fixed object is not less than the other safety car-to-car distance $D_2$, namely the question whether or not the following formula (first formula B of decision) is satisfied, is judged (step S101).

$$Ls - D_2 \geq 0$$

When this judgment derives YES as the answer, the car-to-car alert alarm is selected (step S105). When the judgment derives NO as the answer, the flow of process advances to the step 102. Incidentally, when the car-to-car alert alarm is selected, the prescribed operation is further carried out to select either the car-to-car alert alarm in the green color or the car-to-car alert alarm in the orange color.

At the step S102, the foot transfer time $T_2$ for rear-end collision alarm is read out to find the reference value X($T_2$) (FIG. 21 refers). Thereafter, the question whether or not the own car's speed $V_2$ is greater than the reference value X($T_2$), namely whether or not the following formula (second formula of decision) is satisfied, is judged (step S103).

$$V_2 > X(T_2)$$

When the judgment derives YES as the answer, the rear-end collision alarm is selected (step S107). When the judgment derives NO as the answer, the question whether the route reaching the judgment at the step S103 is P or Q is judged (step S104). When this judgment derives the route P, the car-to-car danger alarm is selected (step S106). When the judgment derives the route Q as the answer, the car-to-car alert alarm is selected (step S105).

Meanwhile, when the setting of the safety car-to-car distance D is completed where the own car's deceleration is not less than 10%, first the question whether or not the distance Ls to the fixed object is not less than the safety car-to-car distance D, namely whether or not the following formula (first formula of decision) is satisfied (step S108).

$$Lc - D \geq 0$$

When this judgment derives YES as the answer, the car-to-car alert alarm is selected (step S111). Here again, the prescribed operation is further performed to select either the car-to-car alert alarm in the green color or the car-to-car alert alarm in the orange color. In contrast, when the judgment derives NO as the answer, the foot transfer time $T_2$ for rear-end collision alarm is read out to find the reference value X($T_2$) (step S109) and the question whether or not the own car's speed $V_2$ is greater than the reference value X($T_2$), namely whether or not the following formula (second formula of decision) is satisfied, is judged (step S110).

$$S > X(T_2)$$

When this judgment derives YES as the answer, the rear-end collision alarm is selected (step S113). When the judgment derives NO as the answer, the car-to-car danger alarm is selected (step S112).

In this case again, therefore, the question whether a rear-end collision alarm is issued, a car-to-car danger alarm is issued, or a car-to-car alert alarm is issued is judged by using the first formula of decision (Lc−D$_1$≧0 and Lc−D$_2$≧0 or the like) and the second formula of decision (V$_2$>X(T$_2$) or the like) and, moreover, the foot transfer time T$_1$ for car-to-car alarm and the foot transfer time T$_2$ for rear-end collision alarm can be designated separately of each other. Accordingly, even when the foot transfer time T$_1$ for car-to-car alarm is set so as to render the issuance of the car-to-car danger alarm difficult with due respect to the possibility of traffic congestion, for example, the rear-end collision alarm is infallibly issued so long as the foot transfer time T$_2$ for rear-end collision alarm is set at the actual driver's own speed of reaction.

Figure 16:
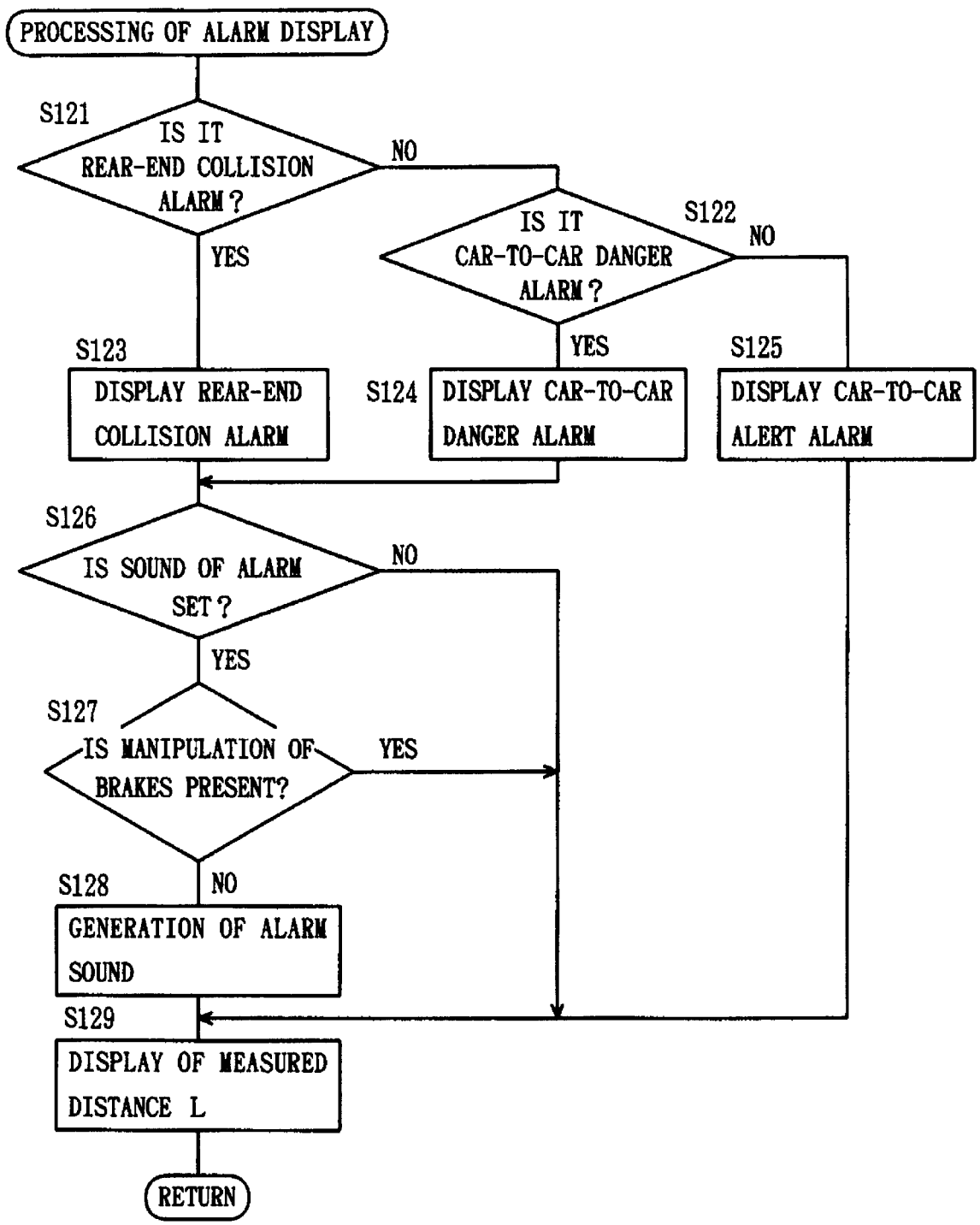
FIG. 16 is a flow chart of the processing of alarm display shown in FIG. 5.

FIG. 16 is a flow chart of the processing for display of alarm shown in FIG. 5.

In this processing for display of an alarm, first the question what kind of alarm has been selected in the processing for judging danger at the step S53 or the step S54 is judged (step S121, step S122). When this judgment finds the rear-end collision alarm as the answer, the rear-end collision alarm is displayed, namely the red color LED 22c disposed in the display part 10 is flickered (step S123). When the judgment finds the car-to-car danger alarm as the answer, the car-to-car danger alarm is displayed, namely the red color LED 22c is lighted (step S124). When the judgement finds the car-to-car alert alarm as the answer, the car-to-car alert alarm is displayed, namely the orange color LED 22b or the green color LED 22a is lighted, depending on the degree of danger (step S125).

When the rear-end collision alarm or the car-to-car danger alarm is selected, the sound of alarm is issued to arouse the driver's attention (step S128) only when the user has set the sound of alarm at the ON status (step S126) and he has not applied the brakes (step S127). In any other case, namely when the user has set the sound of alarm at the OFF status or he has already applied the brakes, the sound of alarm is not issued notwithstanding the rear-end collision alarm or the car-to-car danger alarm has been selected. Absolutely no sound of alarm is issued in the case of the car-to-car alert alarm as described above.

Then, at the step s129, the distance Lc or Ls to the object for measurement is displayed in the unit of 1 m, for example, in the led part 21 which is provided in the display part 10.

What is claimed is:

1. An automotive car-to-car distance alarm device adapted to measure a distance between a user's own automobile and an object existing ahead of the own automobile, judge the presence or absence of danger based on distance data thus obtained, and issue an alarm on the case where it is judged to be dangerous, characterized by comprising:

distance measuring means for emitting a light beam in a prescribed plurality of directions and measuring a distance to an object in the plurality of directions;

first discriminating means for comparing a change of the distance measured in the first and the second measurement in the same direction by said distance measuring means with a distance of travel of the own automobile and discriminating whether an object existing in that direction is a moving object or a fixed object;

second discriminating means for, when said first discriminating means has judged the presence of not less than a prescribed number of fixed objects ahead of the own automobile, regressing distance data thereof to find the standard deviation and comparing the obtained standard deviation with a prescribed value thereby discriminating whether or not the fixed objects are exclusively nonobstacles incapable of obstructing the travel of the own automobile;

danger deciding means for deciding the presence or absence of danger by a prescribed formula of decision, depending on the kind of object discriminated by said first discriminating means or said second discriminating means; and alarm issuing means for issuing a prescribed alarm when said danger deciding means has judged the presence of danger.

2. An automotive car-to-car distance alarm device according to claim 1, wherein said distance measuring means emits the light beam in a prescribed plurality of directions as shifted by a prescribed angle.

3. An automotive car-to-car distance alarm device according to claim 1, wherein said danger deciding means corrects a numerical value of a prescribed parameter forming the formula of decision so as to render the issuance of an alarm difficult when the fixed objects are exclusively nonobstacles.

4. An automotive car-to-car distance alarm device according to claim 1, wherein said danger judging means corrects a numerical value of a prescribed parameter forming the formula of decision in accordance with weather.

5. An automotive car-to-car distance alarm device adapted to measure a distance between a user's own automobile and an object existing ahead of the own automobile, judge the presence or absence of danger based on distance data thus obtained, and issue an alarm on the case where it is judged to be dangerous, characterized by comprising:

distance measuring means for emitting a light beam in a prescribed plurality of directions and measuring a distance to an object in the plurality of directions;

first discriminating means for comparing a change of the distance measured in the first and the second measurement in the same direction by said distance measuring means with a distance of travel of the own, automobile and discriminating whether an object existing in that direction is a moving object or a fixed object;

second discriminating means for, when said first discriminating means has judged the presence of not less than a prescribed number of fixed objects ahead of the own automobile, regressing distance data thereof to find the standard deviation and comparing the obtained standard deviation with a prescribed value thereby discriminating whether or not the fixed objects are exclusively nonobstacles incapable of obstructing the travel of the own automobile;

danger deciding means provided with a first alarm to be issued when it is in such a state as urges alert and necessitates deceleration or application of brakes and a second alarm to be issued when it is in such a state as deserves alert and yet falls short of necessitating deceleration or application of brakes and adapted to selectively judge the question whether the first alarm is issued, the second alarm is issued, or neither of the alarms is issued in accordance with a first formula of decision formed of one or more formulas of decision taking into account a safety car-to-car distance and a second formula of decision taking into account a difference of speed between the own car and the object, depending on the kind of object discriminated by said first discriminating means or said second discriminating means; and alarm issuing means for issuing an alarm in accordance with the result of the decision by said danger deciding means.

6. An automotive car-to-car distance alarm device according to claim 5, wherein each timing for issuing the first alarm and the second alarm can be adjusted separately of each other by the user.

7. An automotive car-to-car distance alarm device according to claim 6, wherein said adjustment of each timing for issuing the first alarm and the second alarm is effected by the setting of respective foot transfer times.

8. An automotive car-to-car distance alarm device according to claim 5, wherein the first alarm is displayed by the flickering of a red lamp and the second alarm is displayed at least by the lighting of a red lamp.

9. An automotive car-to-car distance alarm device according to claim 5, wherein said distance measuring means emits the light beam in six directions as shifted by a prescribed angle.

10. An automotive car-to-car distance alarm device according to claim 5, wherein said danger deciding means corrects a numerical value of a prescribed parameter forming the formula of decision so as to render the issuance of an alarm difficult when the fixed objects are exclusively non-obstacles.

11. An automotive car-to-car distance alarm device according to claim 5, wherein the danger deciding means corrects a numerical value of a prescribed parameter forming the formula of decision in accordance with weather.

* * * * *